(12) United States Patent
Bethge et al.

(10) Patent No.: US 8,750,603 B2
(45) Date of Patent: Jun. 10, 2014

(54) METHOD AND DEVICE FOR IMAGE COMPRESSION

(75) Inventors: Matthias Bethge, Tübingen (DE); Reshad Hosseini, Tübingen (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 847 days.

(21) Appl. No.: 12/958,772

(22) Filed: Dec. 2, 2010

(65) Prior Publication Data
US 2011/0069755 A1 Mar. 24, 2011

Related U.S. Application Data

(63) Continuation of application No. PCT/EP2009/004059, filed on Jun. 5, 2009.

(30) Foreign Application Priority Data

Jun. 6, 2008 (EP) .................................. 08010343

(51) Int. Cl.
*H04N 7/30* (2006.01)

(52) U.S. Cl.
USPC ...................... 382/159; 375/240.02

(58) Field of Classification Search
USPC ...................... 375/240.02; 382/159
See application file for complete search history.

(56) References Cited

U.S. PATENT DOCUMENTS

| | | | |
|---|---|---|---|
| 4,878,186 A * | 10/1989 | Gagnon | 702/194 |
| 5,719,961 A | 2/1998 | Normile | |
| 2002/0133317 A1* | 9/2002 | Kadtke et al. | 702/189 |
| 2006/0210181 A1 | 9/2006 | Wu | |

FOREIGN PATENT DOCUMENTS

| | | |
|---|---|---|
| EP | 0239076 | 9/1987 |
| WO | WO 2009/146933 | 12/2009 |

OTHER PUBLICATIONS

Robert D. Dony "Optimally Adaptive Transform Coding", IEEE Transactions on Image Processing, vol. 4, No. 10, Oct. 1995. pp. 1358-1370.*

Bing Zeng et al: "Directional Discrete Cosine Transforms for Image Coding" Multimedia and Expo, 2006 IEEE International Conference on, IEEE, PI, Jul. 1, 2006, pp. 721-724.

Chun, K.W.; Lim, K.W.; Cho, H.D.; RA, J.B.: "An adaptive perceptual quantization algorithm for video coding" International Conference on Consumer Electronics. ICCE, vol. 39, No. 3, Aug. 1, 1993, pp. 555-558.

Dony R D et al: "Optimally Adaptive Transform Coding" IEEE Transactions on Image Processing, IEEE Service Center, Piscataway, NJ, US, vol. 4, No. 10, Oct. 1, 1995, pp. 1358-1370.

Jingjing Fu et al: "Diagonal Discrete Cosine Transforms for Image Coding" Advances in Multimedia Information Processing—PCM 2006 Lecture Notes in Compurter Science;; LNC, Springer, Berlin, DE, vol. 4261, Jan. 1, 2006, pp. 150-158.

(Continued)

*Primary Examiner* — Sath V Perungavoor
*Assistant Examiner* — Jeffery Williams
(74) *Attorney, Agent, or Firm* — Siritzky Law, PLLC

(57) ABSTRACT

A method for compressing a digital image includes selecting an image patch of the digital image; assigning the selected image patch to a specific class (z); transforming the image patch, with a pre-determined class-specific transformation function; and quantizing the transformed image patch, wherein parameters of the classifier have been learned from a set of training image patches.

6 Claims, 30 Drawing Sheets

(56) References Cited

OTHER PUBLICATIONS

Philips W Ed—Vandewalle J et al: "An Adaptive Orthogonal Transform for Image Data Compression" Signal Pricessing Theories and Applications. Brussels, Aug. 24-27, 1992; [Proceedings of the European Signal Processing Conference (EUSIPCO)], Amsterdam, Elsevier, NL, vol. 3, Aug. 24, 1992, pp. 1255-1258.

Search Report in International Appln. PCT/EP2009/004059, mailed Dec. 12, 2009.
Wallace G K: "The JPEG Still Picture Compression Standard" IEEE Transactions on Consumer Electronics, IEEE Service Center, New York, NY, US, vol. 38, No. 1, Feb. 1, 1992, pp. XVIII-XXXIV.
EPO, File history of EP2131594B1, downloaded from EPO on Feb. 19, 2014 [232 pgs.].

* cited by examiner

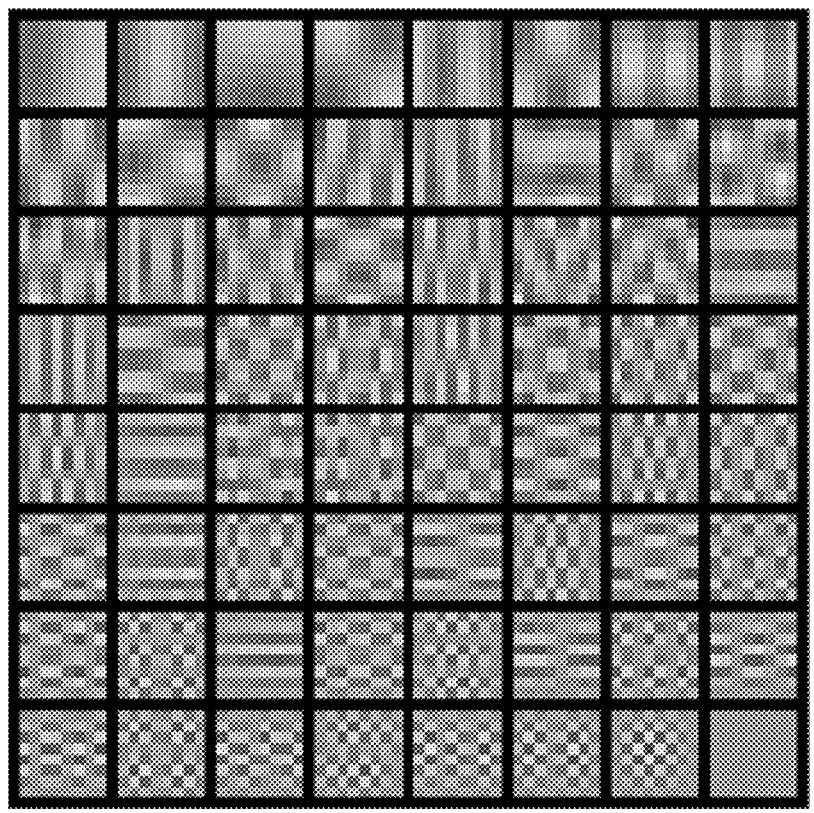
Fig. 4(a) Edge cluster in 90 degrees

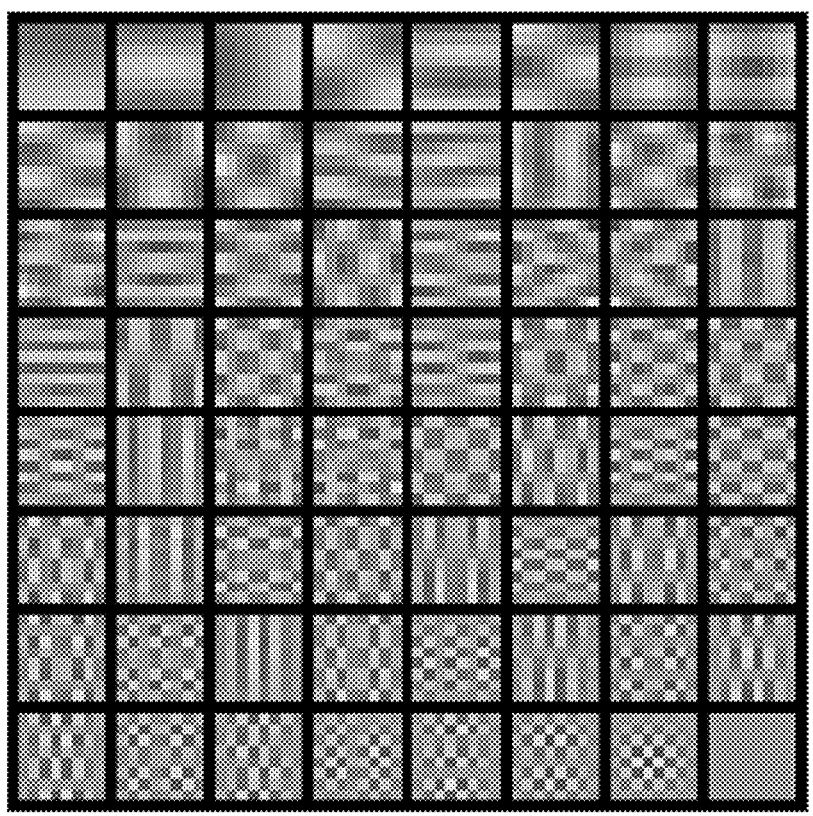
Fig. 4(b) Edge cluster in 0 degrees

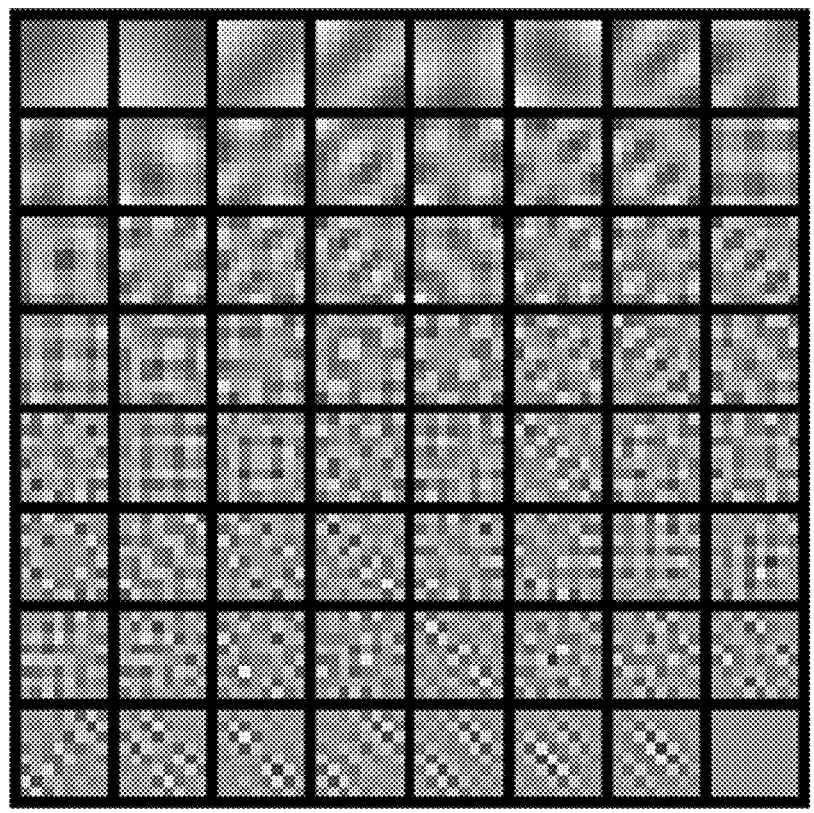
Fig. 4(c) Edge cluster in 45 degrees

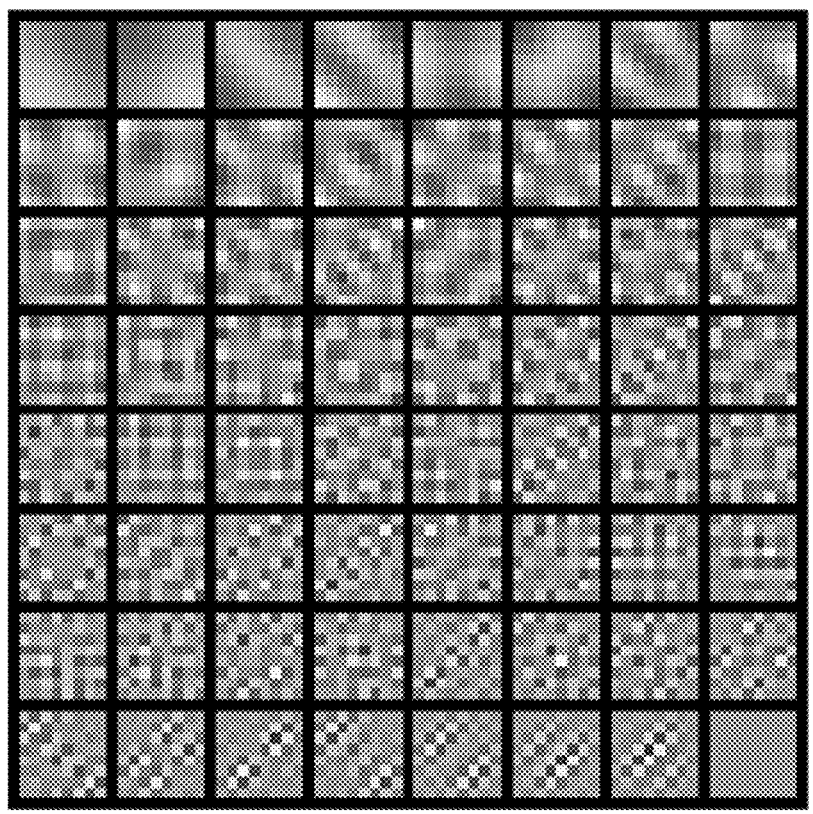
Fig. 4(d) Edge cluster in 135 degrees

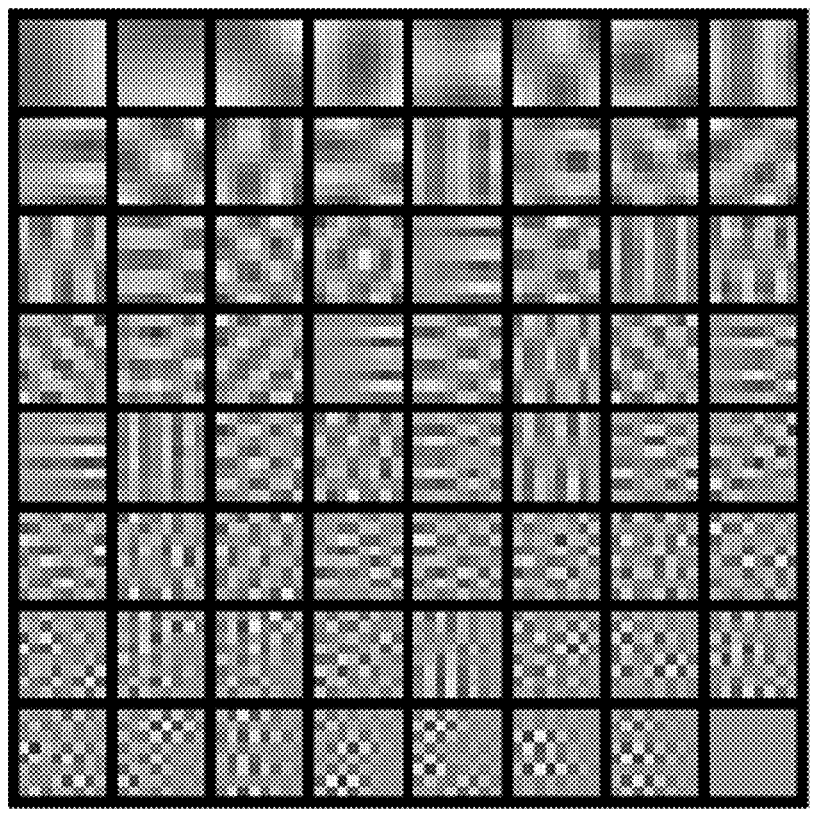
Fig. 4(e) Flat cluster

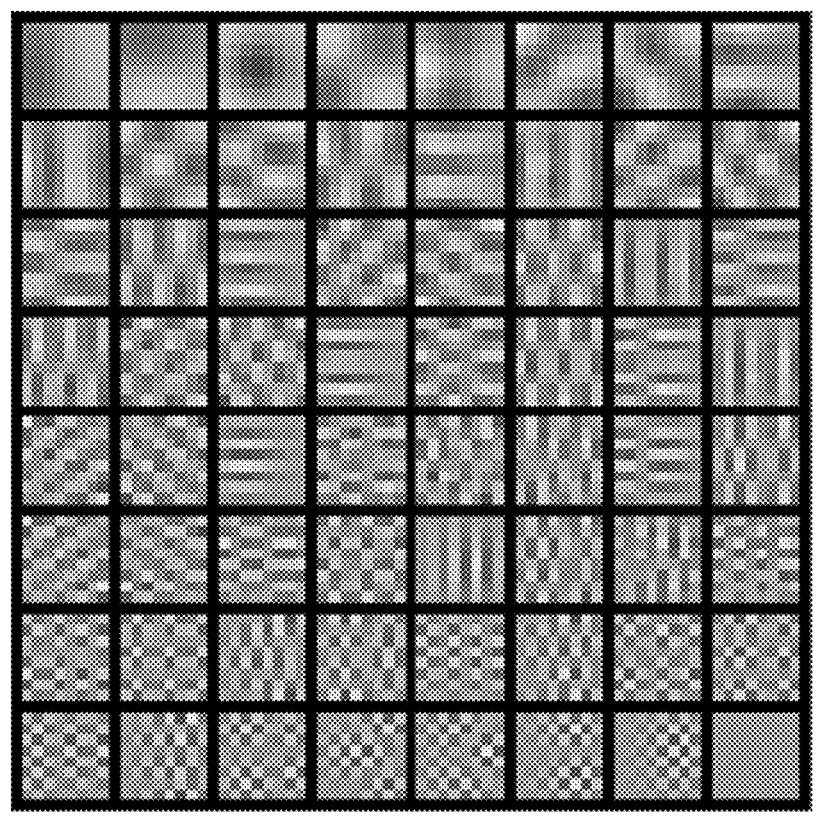
Fig. 4(f) Texture cluster

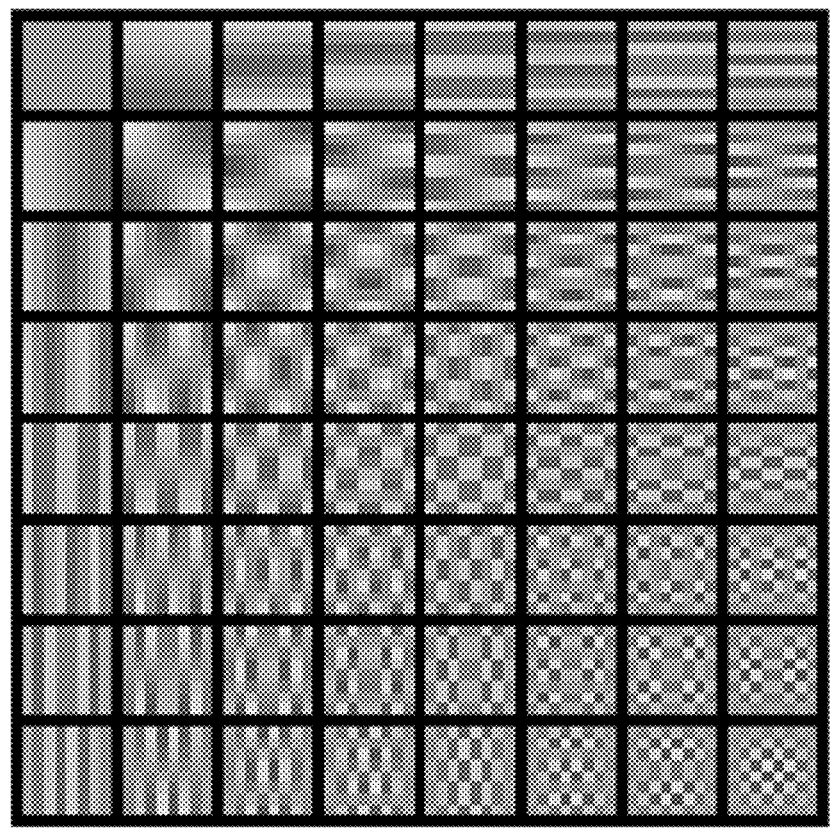
Fig. 8(a) DCT Basis

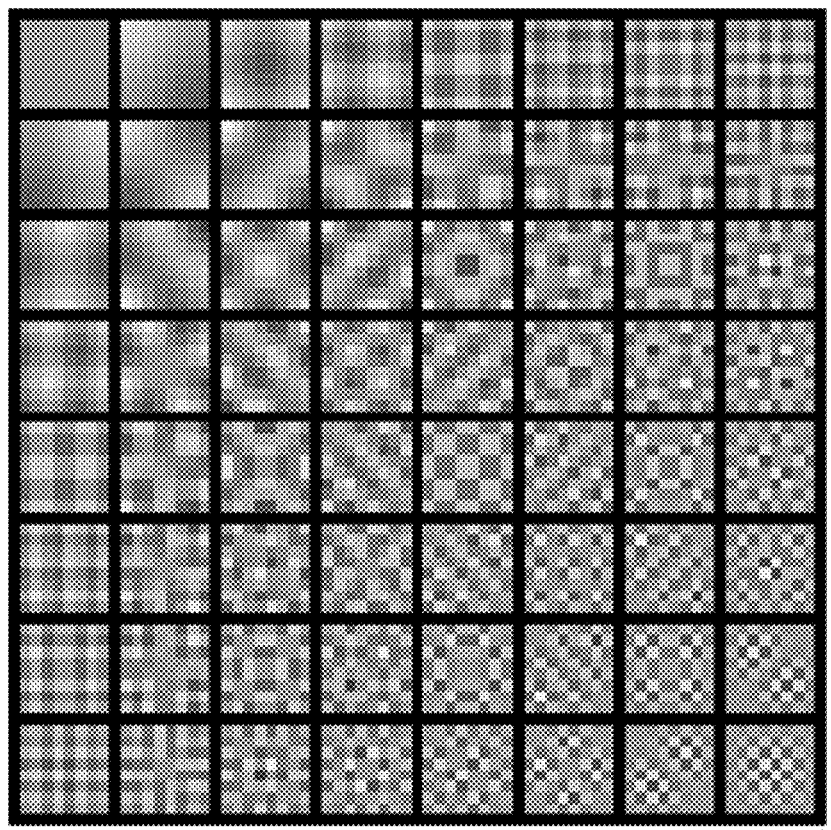
Fig. 8(b) Derived Basis

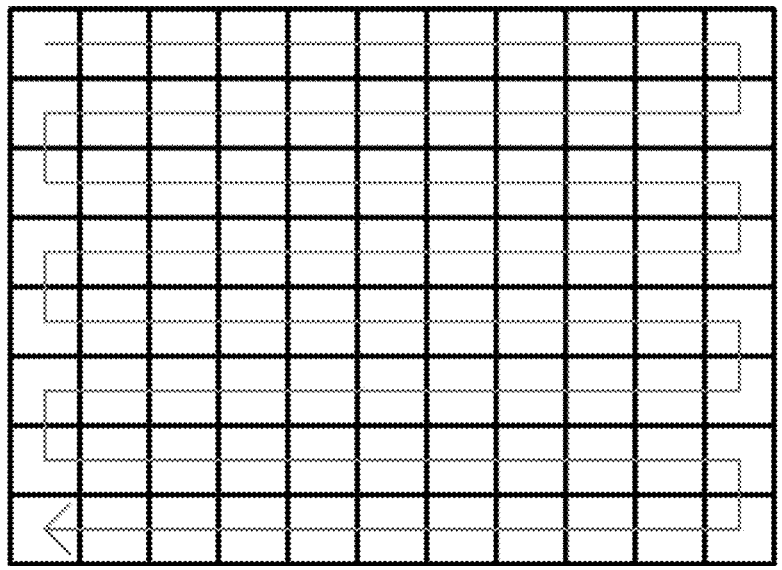
Fig. 10a 0 degree
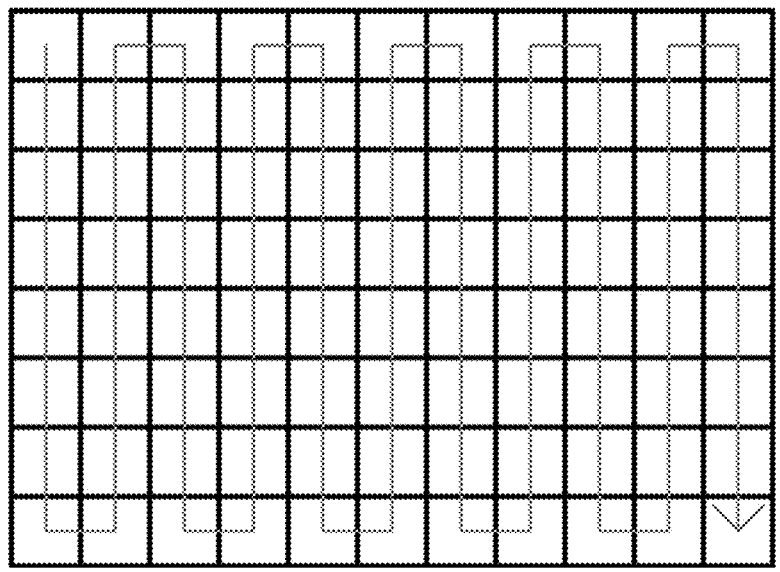
Fig. 10b 90 degrees

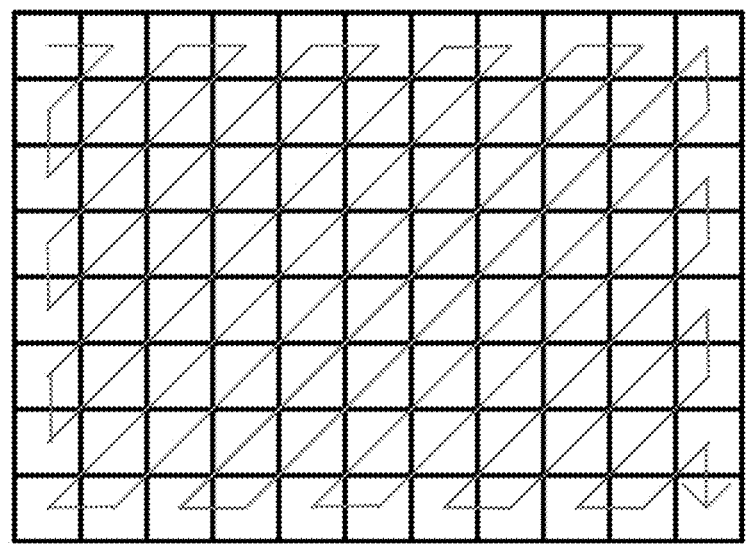
Fig. 10c  45 degrees
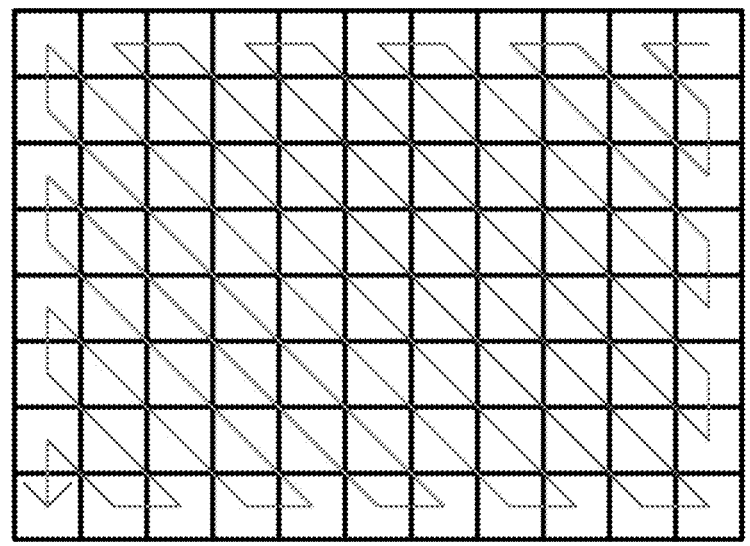
Fig. 10d  135 degrees

Psychophysical error percentage as a function of coefficient error

Histogram over coefficient magnitude

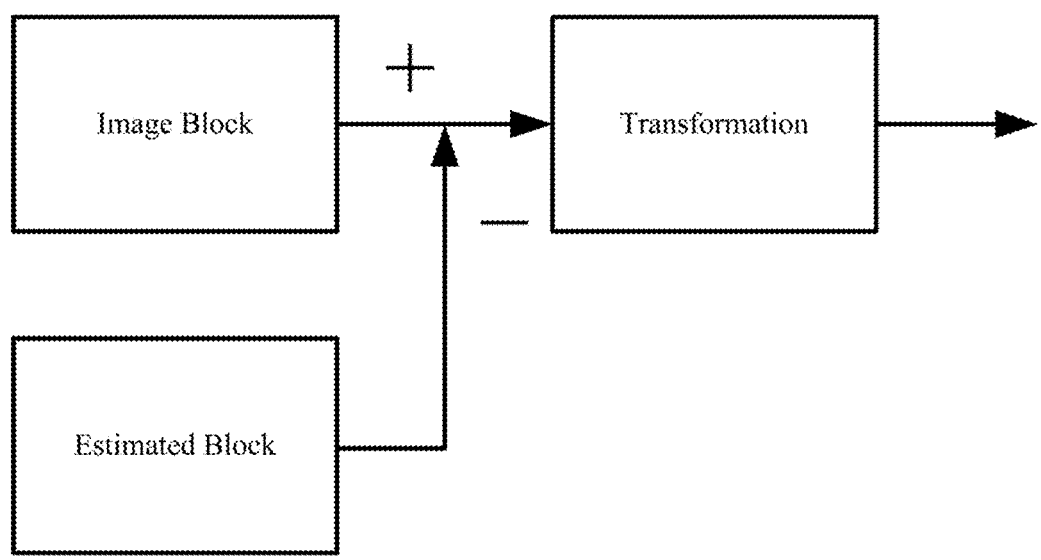
Fig. 16(a) MPEG method

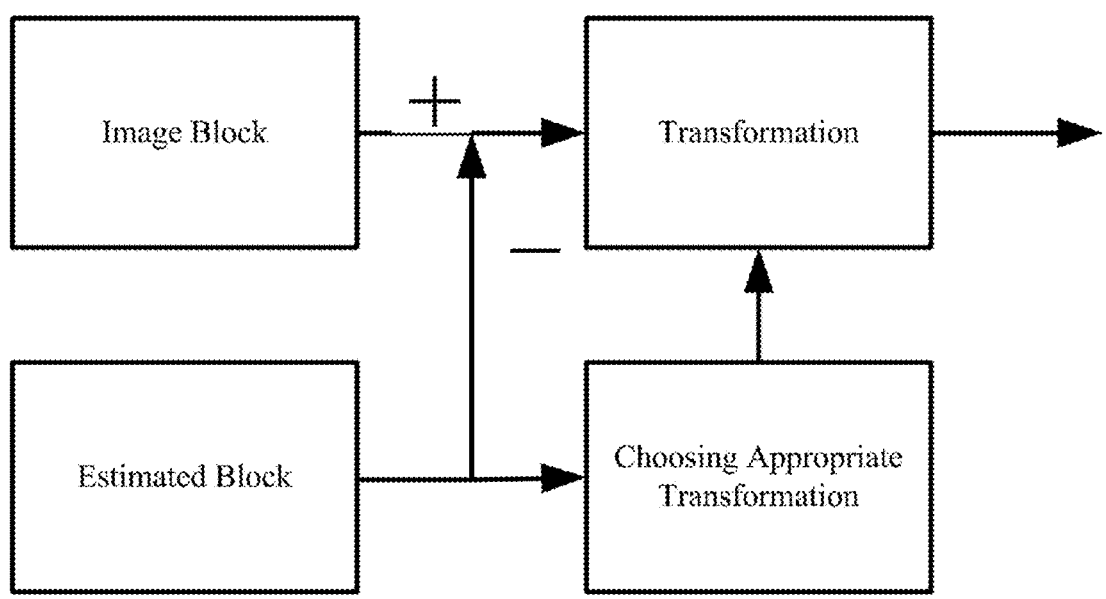
Fig. 16(b) Method according to the invention

METHOD AND DEVICE FOR IMAGE COMPRESSION

CROSS-REFERENCE TO RELATED APPLICATIONS

This application is a continuation of and claims priority from International Patent Application No. PCT/EP2009/004059, filed Jun. 5, 2009, titled "Method and Device for Image Compression," which designated the United States and which claims priority from European Patent Application No. EP 08010343.5, filed Jun. 6, 2008. The entire contents of both of these applications (PCT/EP2009/004059 and EP 08010343.5) are fully incorporated herein for all purposes.

The present invention relates to a method and a device for compressing digital (video) images.

TECHNICAL BACKGROUND AND PRIOR ART

Digital image compression aims to identify and remove redundancies from digital image data in order to be able to store or transmit the data in an efficient form. When compressing natural images, such as photos, a minor loss of fidelity is often accepted in order to achieve a substantial reduction in bit rate, particularly when the infidelity is not perceivable to the human eye. This so-called 'lossy' image compression may be achieved by reducing the color space to the most common colors in the image, for example. It may also be achieved by chroma subsampling, taking advantage of the fact that the eye perceives brightness more sharply than color, by dropping half or more of the chrominance information in the image.

As a further example, the well-known JPEG standard uses transform coding, wherein the image data is transformed by the discrete cosine transform (DCT), followed by quantization and entropy coding. In the field of image compression, the JPEG standard provides very efficient compression methods.

In particular, JPEG is the most successful lossy image compression method. However, JPEG compression is prone to blocking artifacts in low-contrast image patches and ringing artifacts in high-contrast image patches. The reason for the blocking artifacts in low-contrast image patches is the sensitivity of the human visual system to noise in flat image patches and the reason for the ringing artifacts is the fact that, applying the same transform to all different kinds of image patches, JPEG tends to neglect high-frequency components in the vicinity of edges.

A possible way of dealing with this situation is, instead of applying the same coding transform throughout the entire image, to use different coding transforms for different kinds of image patches.

In this respect, J. Fu et al. ("Diagonal Discrete Cosine Transforms for Image Coding", Zuang et al (Eds.): PCM 2006, LNCS 4261, pp. 150-158, Springer-Verlag Berlin Heidelberg 2006) discuss a method for image coding which combines conventional DCTs and diagonal discrete cosine transforms in different modes. However, a way of effectively selecting the most suitable mode for each image patch is not disclosed; instead, a brute-force approach is adopted: quantization and coding is run for all modes and only after all these steps, the best result is chosen according to a rate-distortion criterion. This approach is computationally expensive and may therefore not be well suited for all different kinds of practical application.

Moreover, a desirable property of an image compression scheme is scalability, also referred to as progressive coding or embedded bit streams. Scalability is especially useful for previewing images while loading (e.g. in a web browser) or for providing variable quality access to e.g. databases. Several types of scalability may be distinguished:

Quality progressive or layer progressive: The bitstream successively refines the reconstructed image.
Resolution progressive: First encode a lower image resolution; then encode the difference to higher resolutions.
Component progressive: First encode grey; then color.

In that respect, the method presented by Fu et al. is limited to the known sequential mode of image compression: if it is not known a priori which transform may be used for a given image patch, the rate-distortion criterion cannot be used in progressive or hierarchical mode, as these modes combine the coefficients of different image patches. For sequential mode coding, it is known that the ordering of the basis functions is crucial for good compression performance. However, the article by Fu et al. does not disclose how to find such orderings.

It is therefore an object of the present invention to provide a method for image coding that is not only more effective in terms of compression but also computationally more efficient. A particular object is to provide a sound method for image coding that may adapt to the image content, thereby improving compression in terms of space requirements and/or image quality, while preserving computational efficiency.

It is a further object of the present invention, to provide a method and device for compressing an image with an improved compression ratio that essentially avoids blocking artifacts in low-contrast image patches and ringing artifacts in high-contrast image patches. It is yet another object, to provide an efficient method and device for compressing an image that allows for scalability of the compressed image.

SHORT SUMMARY OF THE INVENTION

This object is achieved by a method according to independent claim 1. Advantageous embodiments are defined in the dependent claims.

A method for compressing a digital image may be implemented on a computer and may comprise the steps of selecting an image patch of the digital image; assigning the selected image patch to a specific class (z); transforming the image patch with a pre-determined class-specific transformation function; and quantizing the transformed image patch.

Each class of image patches is associated with a different class-specific transformation function. An image patch is defined as an actual part of an image, e.g. an element of a tiling or tessellation of the image. Preferably, the size of an image patch is small, e.g. not larger than 8×8 image pixels.

According to the invention, the image patch may be assigned to a specific class z using a statistical classifier, the parameters of which have been learned from a set of training image patches. By working on the level of small image patches, the inventive method may advantageously account for the non-stationary statistics of individual images.

Different sets of training image patches may be used for optimizing the parameters of the statistical classifier for different sorts of image data. A reference database of training image patches may particularly comprise patches of natural images (images or photographs of natural human environments). It may also be tailored for specific applications. E.g., it may be limited to satellite images, infrared images, closed-circuit television (CCTV) images, underwater images, faces or portraits, night images and other reasonable categories of images, for example images generated by different devices such as mobile phones, digital cameras, medical image sensors, etc. A particular advantage of the invention is therefore, that the compression method according to the invention may be automatically tailored to a specific application field, by learning the parameters of a statistical quantifier based on a reference database of images or image patches from that particular field of application.

The statistical classifier may assign the image patch to a class (z) such that:

$$\sum_{i=1}^{M} \alpha_i^z (c_i^z)^2 \ z \in \{1, \ldots, K\},$$

becomes maximal, wherein K is a number of classes, z is a class index, $\alpha_i^z$ are weighting coefficients and $c_i^z$ is the i-th transformation result of the z-th transformation function applied to the image patch and M is the total number of transformation result coefficients not including the DC coefficient ($M=N^2-1$ in the case of an N×N image patch). Given that fast class-specific transformation functions are chosen, this particular statistical classifier may quickly be evaluated.

The parameters of the statistical classifier may have been learned using a mixture of statistical distributions. Preferably, the mixture of statistical distributions may be a mixture of angular Gaussian distributions. Alternatively, the mixture of statistical distributions may be a mixture of $L^P$-elliptical distributions, defined by the following density function $$\rho(x) = f\left(\sqrt[p]{\sum_i \left|\sum_j A_{ij} x_j\right|^p}\right),$$

wherein f is an arbitrary function and x is a vector representing an image patch.

A class-specific transformation function may be represented by an eigenvector basis of a covariance matrix ($\Lambda_z$) of the statistical distribution of the respective class (z). Particularly, the vectors of the eigenvector basis may be ordered in decreasing order of the magnitude of their corresponding eigenvalues.

A table used for quantization may be specific to the class (z) of the image patch.

A method according to the invention may further comprise the step of entropy coding the quantized image patch in sequential, progressive or hierarchical mode. According to a particular aspect, progression may applied in the direction of the edges in image patches.

Entropy coding in progressive and in hierarchical mode may further comprise the steps of checking whether the value of a coefficient is 1 or −1; and if yes, adding an additional bit after the next symbol to be encoded, wherein the additional bit specifies the sign of the coefficient.

The method according to the invention may also be used for video compression, particularly in intra-frame compression, which is essentially equivalent to still image compression. For inter-frame compression, the transformation may be chosen based on the predicting image patch and the inventive method may be applied to the residual.

The method and device according to the invention may be applied to both gray-scale and color images. The encoded image patches may be stored in a machine-readable medium or transmitted via a digital communications channel.

BRIEF DESCRIPTION OF THE FIGURES

These and other aspects of the invention will become more apparent when studying the following detailed description of an embodiment of the invention, together with the annexed drawing in which

FIGS. 4(a)-4(f) show the results for learning 6 clusters according to the method shown in FIG. 3;

FIGS. 8(a)-8(b) show transforms for 8×8 image patches discussed in connection with equations (5) and (6).

FIGS. 10a-10d show progressive scans for edge image patches in different orientations

FIGS. 16(a)-16(b) illustrate how the method of the present invention may be combined with existing video compression methods.

DETAILED DESCRIPTION

Figure 1A:
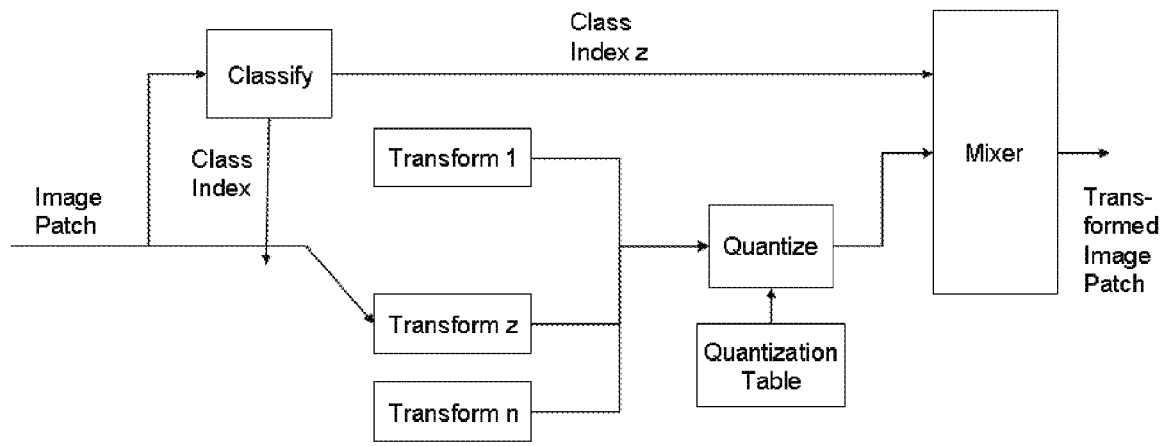
FIG. 1a shows a diagram of a method for image compression according to an embodiment of the invention.

FIG. 1a shows a diagram of a method for image compression according to an embodiment of the invention.

Instead of applying the same transformation function to all image patches, the basic approach of the invention is to select a transformation function based on a classification of the respective image patch. In other words, a method for compressing a digital image comprises the steps of selecting an image patch of the digital image; assigning the selected image patch to a specific class z; and transforming the image patch, with a class-specific transformation function.

A digital image and also a patch thereof may be represented by a vector of values, wherein the values represent e.g. gray levels or color components. After an image patch of an image has been obtained, a transformation function for the image patch may be selected from a predetermined set of transform functions, depending on the respective classification of the image patch.

In a preferred embodiment of the invention, an image patch may be assigned to a specific class of image patches using a statistical classifier, the parameters of which have been learned from a given set or reference database of training image patches.

The class z of the image patch may be determined by the following classifier:

$$Z = \underset{z}{\operatorname{argmax}} \sum_{i=1}^{M} \alpha_i^z (c_z^i)^2, \quad z \in \{1, \ldots, K\} \quad (1)$$

wherein z is the index of the transformation function in the predetermined set of transform functions, $\alpha_i^z$ are weighting coefficients and $c_i^z$ is the i-th transformation result of the z-th transformation function applied to the image patch. M is the total number of components not including the DC coefficient. In the case of a N×N image patch, $M=N^2-1$.

This specific choice of classifier implies that all transformation functions comprised in the predetermined set of transformation functions are applied to the image patch. In other words, by classifying the results of applying the transformation functions to the image patch, the selection depends on the classification of the image patch. In the context of image compression, a suitable selection criterion may be maximum energy compaction, for example.

Then, the procedure may continue with the class index z and the result of that transformation function applied to the image patch that maximizes the chosen criterion.

Particularly, the result may be subject to a quantization. According to a preferred embodiment of the invention, the quantization may also depend on the content of the image patch. Finally, the quantized result may be subject to entropy coding, similar to JPEG.

Figure 1B:
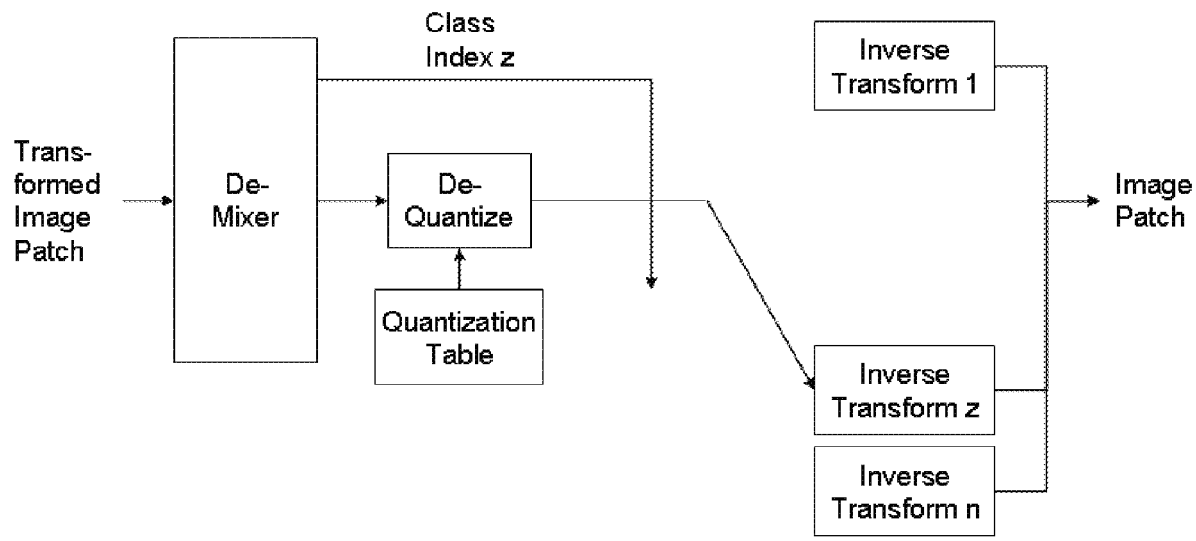
FIG. 1b shows a diagram of a method for decoding an image compressed according to the invention.

FIG. 1b is a block diagram of the corresponding decoding process according to one embodiment of the invention.

First, the coded bitstream is decoded in order to recover the quantized coefficients. Subsequently, the de-quantizer and the inverse transforms may be applied on each image patch.

All of these decoding steps may depend on the class membership of the respective image patch. In order to be able to choose the right inverse transforms, a class membership index may be provided with the coefficients of the coded image patch, i.e. stored in the respective image file.

Images for coding may comprise multiple components, e.g. one luminance and two chrominance components.

Figure 2A:
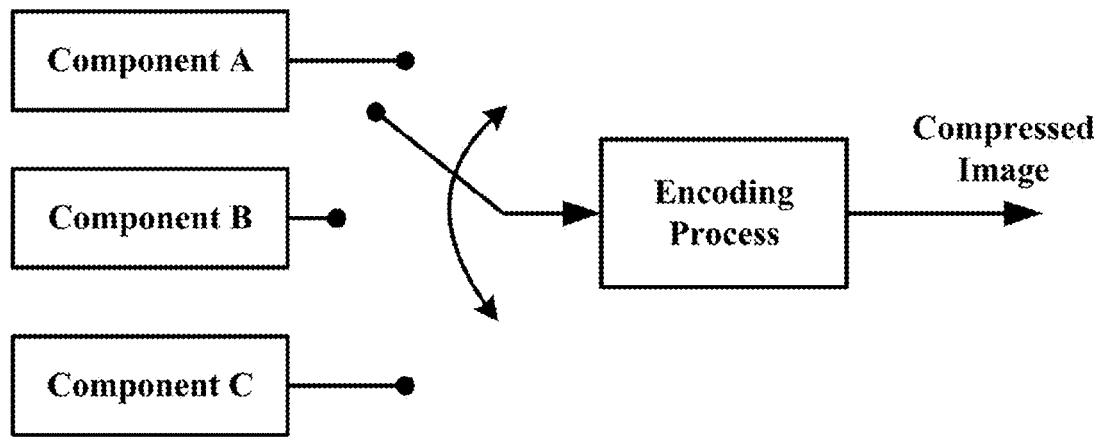
FIG. 2a shows a method for the compression of multiple-component images like color images according to one embodiment of the invention.

FIG. 2a shows a block diagram of a method for compressing multiple-component images, like color images, according to an embodiment of the invention.

As shown, each component may be compressed separately. In other words, each color channel may be treated as an individual image. For each channel then, transforms and quantization tables may be chosen differently in order to match the image statistics and the differences in perceptual sensitivity optimally for each channel.

In the case of one luminance and two chrominance components, class membership may be determined for the luminance component only, as the transforms for the corresponding chrominance components may be uniquely identified from this class assignment of the luminance class. This approach has the advantage that it allows for scalability.

Figure 2B:
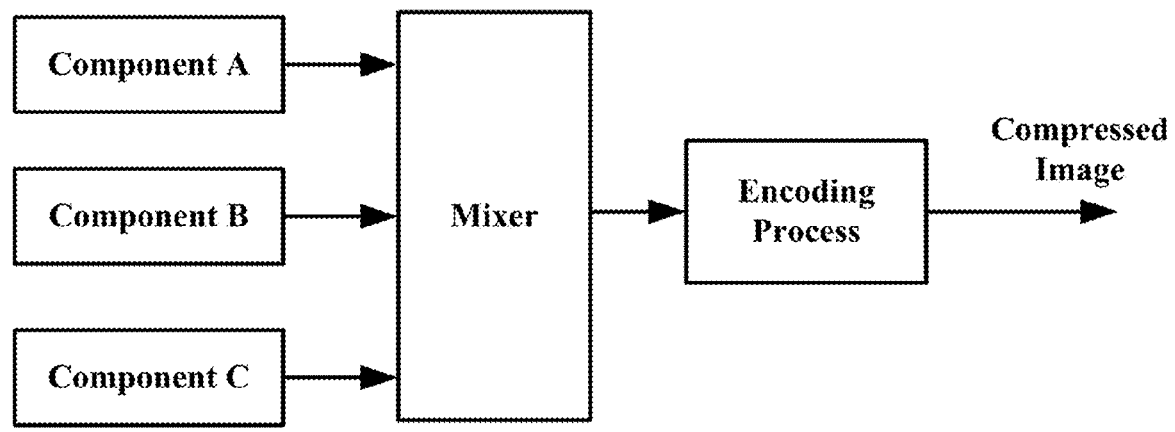
FIG. 2b shows a method for the compression of multiple-component images like color images according to another embodiment of the invention.

FIG. 2b shows a block diagram of a method for compressing multiple-component images according to a second embodiment of the invention As shown, all components for each image patch may be processed together. For instance, in the case of 8×8 image patches taken from color images, a 3×64=192 dimensional vector, i.e. a concatenation of three 64 dimensional vectors (one from each color channel), may be transformed and encoded. Again, such multi-channel image patches may be assigned to different classes specifying the transform and entropy coding parameters. A particular advantage of this embodiment is that correlations between different color channels may be exploited for coding.

Learning the Parameters of the Statistical Classifier

According to the invention, the weighting coefficients may advantageously be learned or derived from the statistics of a given set of training image patches. In particular, the given set of training image patches may advantageously comprise patches taken from natural images.

In particular, the given database of image patches may be clustered in order to determine classes of similar image patches. Based on this clustering, one may then devise class-specific transformation functions that are particularly suited for each individual class of image patches.

Ideally, the weighting coefficients should be learned or derived such that the image patches are clustered into classes having low entropy. In addition, the image patches within each cluster should also have similar properties with respect to the perceptual sensitivity of the human visual system. Furthermore, the resulting compression algorithms should be computationally efficient.

According to the invention, a good compromise regarding these goals is to assume that the statistics of the coefficients within each class z may be described by an angular Gaussian distribution having the following density function:

$$f(l) = \kappa^{-1} |\Lambda_z|^{-\frac{1}{2}} (l' \Lambda_z^{-1} l)^{-\frac{1}{2}N} \quad (2)$$

wherein $$\kappa = 2\pi^{\frac{1}{2}N} / \Gamma\left(\frac{1}{2}N\right),$$

l is a data point on the unit N sphere and $\Lambda_z$ is a symmetric, positive matrix for cluster z proportional to the covariance matrix of the data with an arbitrary scaling (scaling of $\Lambda$ does not change the distribution).

After carrying out a clustering of a database of image patches, assuming e.g. the above statistical distribution, the weighting coefficients $\alpha_i^z$ may advantageously depend on the covariance matrix $\Lambda_z$ of a z-th cluster of training image patches from a set of training image patches. In particular, the weighting coefficients $\alpha_i^z$ may satisfy $$\alpha_i^z = \frac{1}{\lambda_i} |\Lambda_z|^{\frac{1}{M}} \quad (3)$$

wherein z is the index of the class or cluster of image patches, $\lambda_i$ is the i-th eigenvalue of the covariance matrix $\Lambda_z$, and $|\Lambda_z|$ is the determinant of the covariance matrix $\Lambda_z$.

Figure 3:
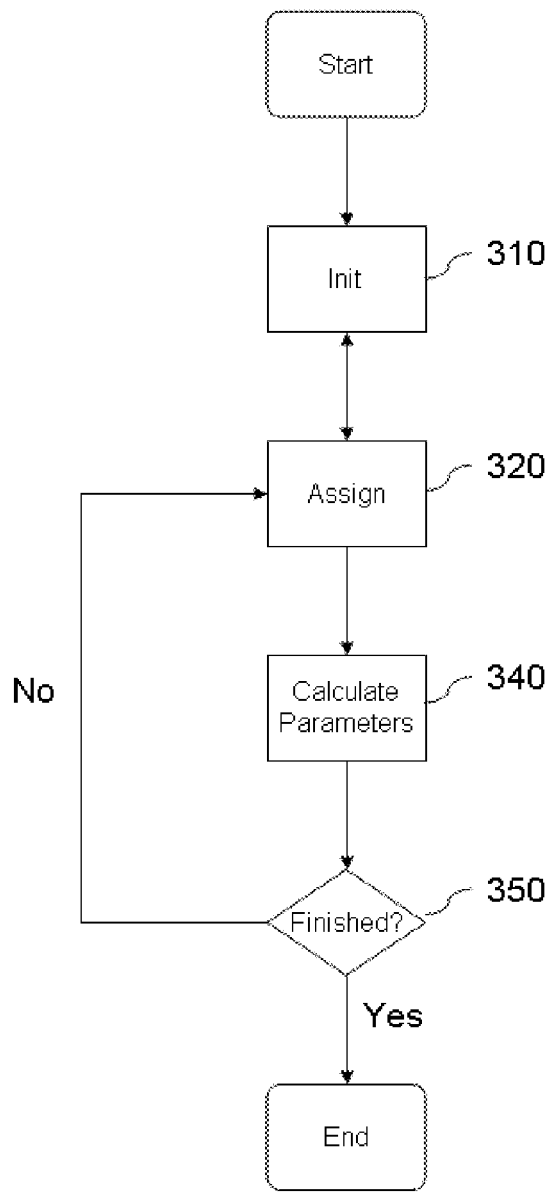
FIG. 3 shows a flow chart of a method for finding transforms and assigning data according to one embodiment of the invention.

FIG. 3 shows a flow chart of a method clustering a database of image patches according to one embodiment of the invention.

In step 310, the number N of clusters is fixed, the means $\mu_z$ are set to zero and the covariance matrices $\Lambda_z$ for each cluster z may be chosen randomly. In one embodiment of the invention, the number N may be set to 6.

In step 320, image patches or data are assigned to the cluster z that maximizes the likelihood according to equation (2), i.e. each cluster is modelled by an angular Gaussian with different covariance matrix $\Lambda_z$.

In other words, each image patch is assigned to a cluster based on its likelihood on the unit-sphere. By this, the above described energy compaction criterion is invariant to the norm of the data. The projection of the data to the unit sphere may also be motivated by the search for a psychophysically meaningful clustering, because the contrast of an image patch should have less influence on class membership than its structural content, e.g. the direction of edges in the images. Moreover, psychophysically meaningful quantization matrices may be derived later on.

In step 330, new parameters, i.e. covariance matrices $\Lambda_z$ may be calculated, given the data assignment. For this calculation, either the maximum likelihood procedure explained in the article by D. E. Tyler ("Statistical analysis for the angular central Gaussian distribution on the sphere", Biometrika, 74(3):579-589, 1987) may be used, or the covariance matrix of the original data (i.e. before normalizing the data to unit length) may be calculated after assigning the data to the cluster, both methods leading to quite similar results.

In step 340, it is checked whether a suitable termination criterion is met, e.g. if the sum of distances between previous parameters and new parameters is smaller than a threshold. If not, the procedure loops back to step 320; otherwise it may stop.

After the procedure has stopped, the covariance matrices of the respective clusters may be used for setting the weights $\alpha_i^z$ for the assignment rule, according to equations (1) and (3).

Moreover, according to one embodiment of the invention, the z-th transformation function may be represented by the eigenvector basis of the learned covariance matrix $\Lambda_z$. More particularly, if the eigenvector decomposition of the covariance matrix $\Lambda_z$ is $UDU^T$, D being a diagonal matrix comprising the eigenvalues (variances) of the respective eigenvector basis U, the matrix $U^T$ may now be used as a transformation basis for the respective class, wherein an image patch x is transformed as $U^T x$, yielding a transformed image patch c. In other words, the transformation functions employed in the image coding method may be learned from a database of training image patches.

FIGS. 4(a)-4(f) show a plot of the resulting eigenvector bases for a given database of image patches used by the inventors, when partitioning the image data into six classes, using the above algorithm. It is noted that the learned bases are similar to the bases of a DCT, but also clusters emerge whose basis reflect the presence of edges in image patches that are tilted in 45 or 135 degrees.

Further, the vectors of the eigenvector basis may be ordered in decreasing order of the magnitude of their corresponding eigenvalues.

Figure 5:
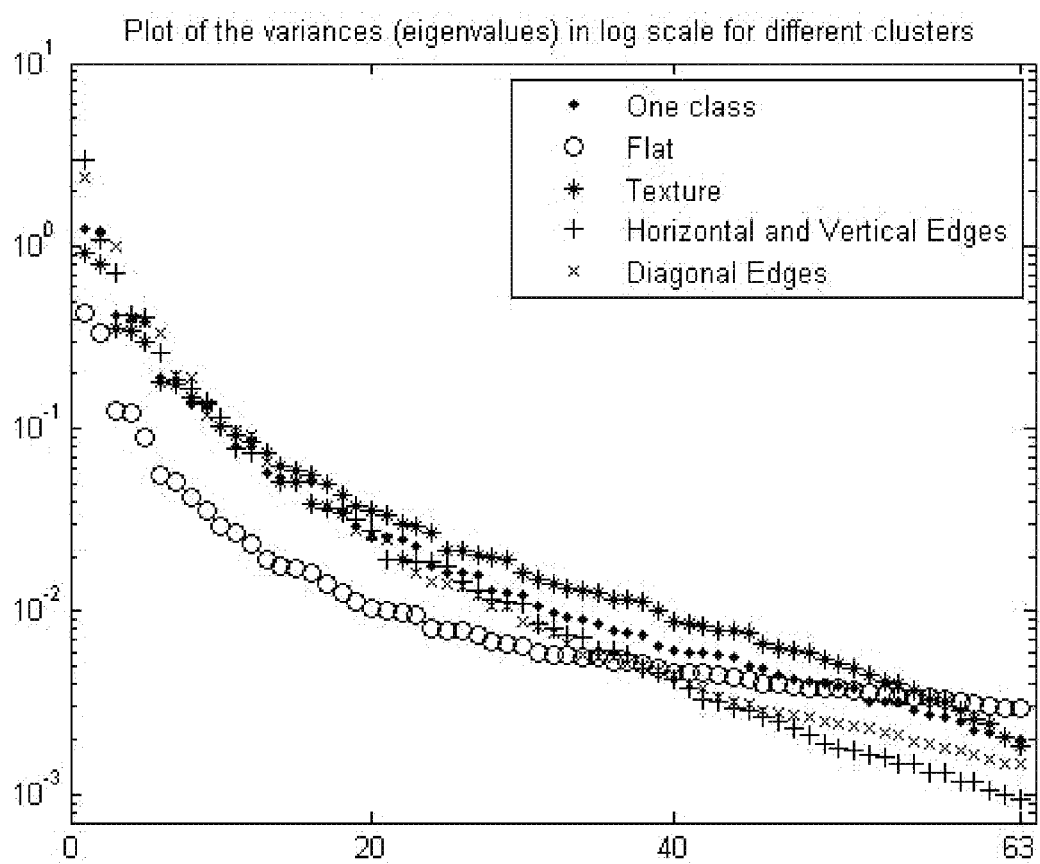
FIG. 5 shows a plot of the variances of different clusters, ordered in decreasing order of magnitude.
Figure 6A:
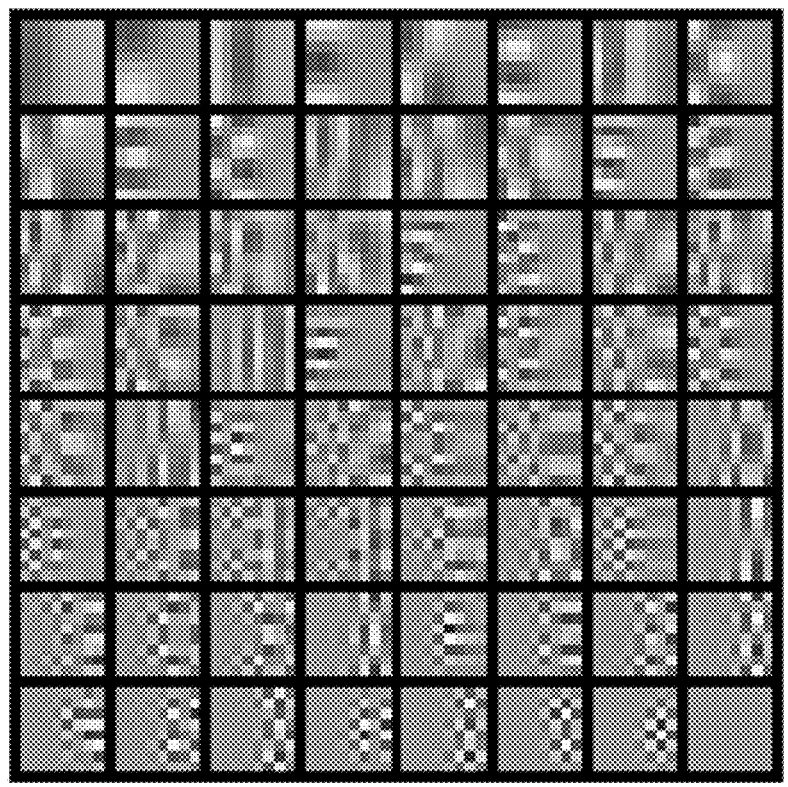
FIGS. 6(a)-6(d) show some results for learning more than 6 clusters showing some bases with localized basis functions.
Figure 6B:
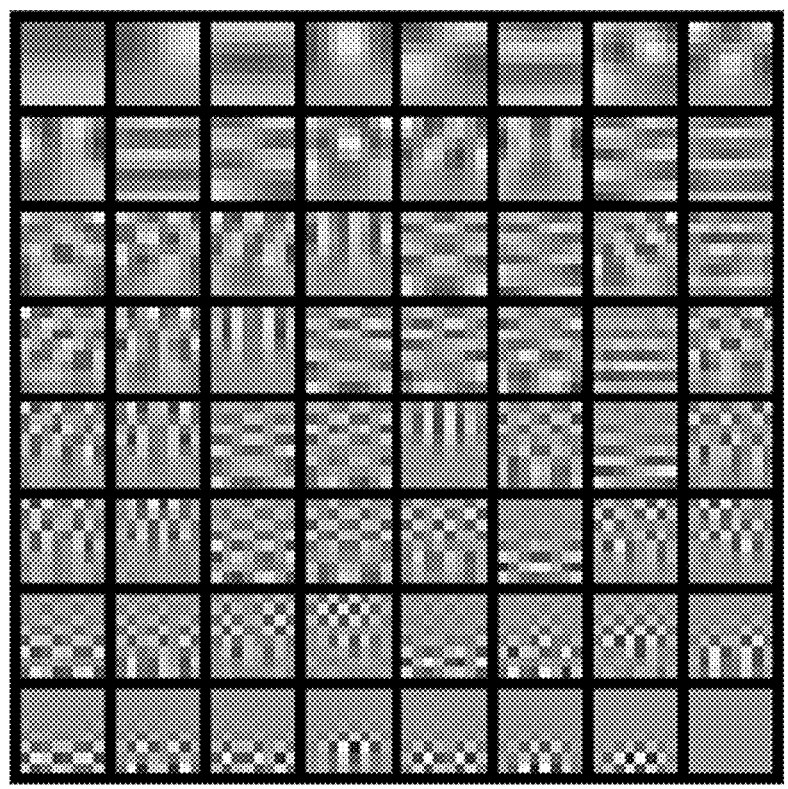
Figure 6C:
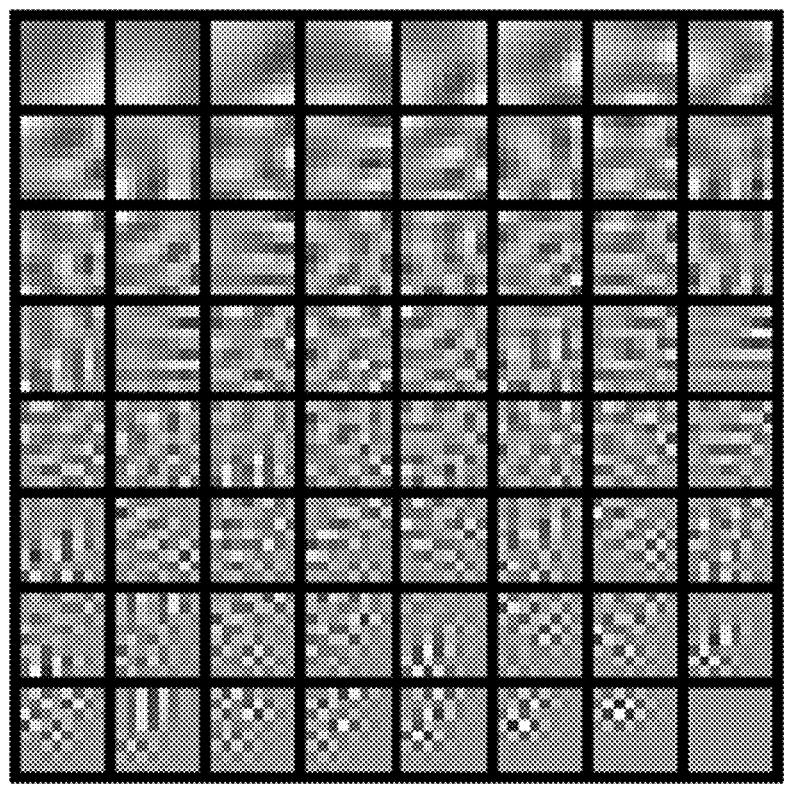
Figure 6D:
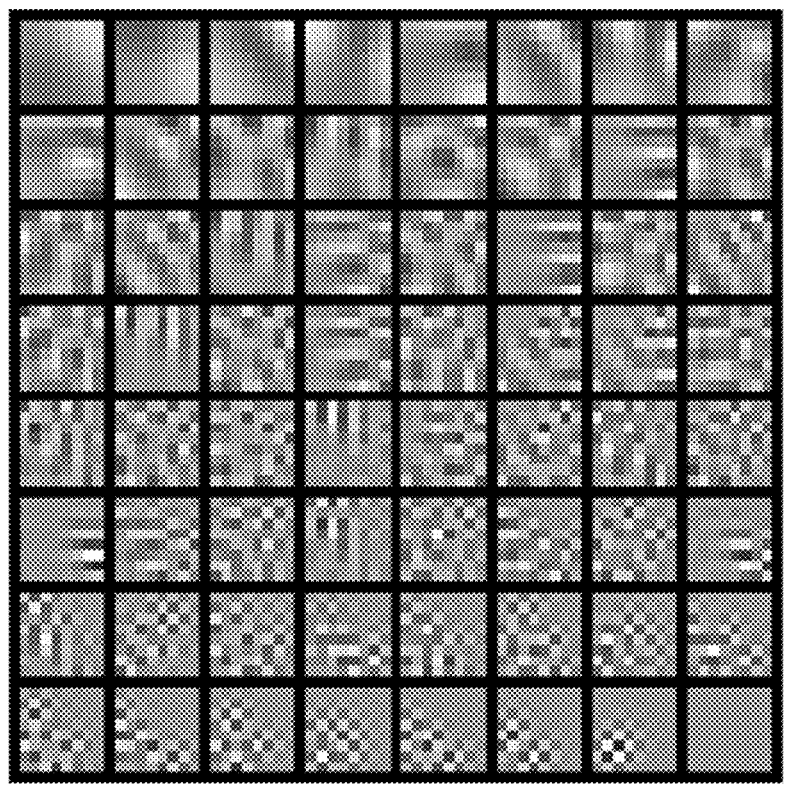

FIG. 5 shows a plot of the variances (eigenvalues) for different clusters in log scale, in order of decreasing magnitude. The clusters, whose variances decrease rapidly, are edge-selective clusters in 0 and 90 degrees (+ symbol) or 45 and 135 degrees (x symbol). The variance of the flat cluster decreases most rapidly in the beginning and saturates at a variance of about $0.4 \cdot 10^{-3}$ (o symbol). For the texture class, the variances decrease slowly (* symbol). For the sake of comparison, the diagram also includes a plot of the decrease in variance that is obtained when a Karhunen-Loéve transformation (KLT) is applied to the entire data set without clustering (· symbol).

FIGS. 6(a)-6(d) show plots of various bases, when the number of clusters is set to values greater than six (N>6). As may be seen, some of the emerging clusters now have a local basis in either left/right, up/down, up-right/down-left, up-left/down-right fashion.

Figure 7:
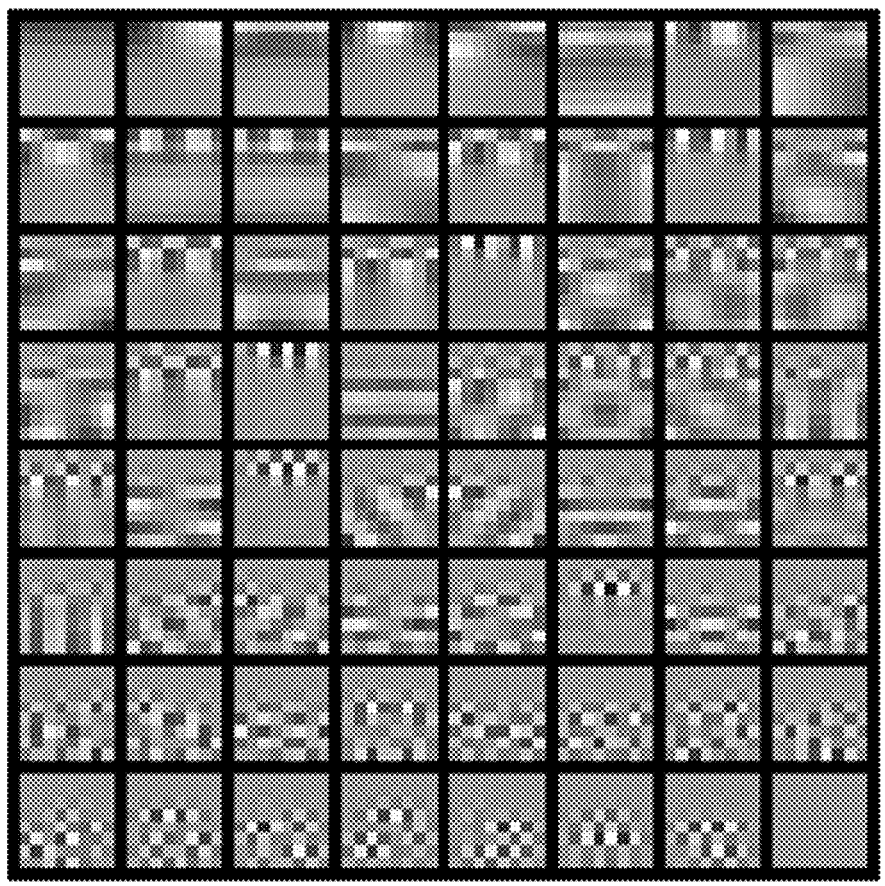
FIG. 7 shows a basis with even more localized basis functions that is obtained when the number of clusters is increased.

FIG. 7 shows the basis functions of a cluster that have become even more localized after further increasing the number of clusters.

By increasing the number of clusters, the variances of the clusters' respective basis will decrease more sharply. In these learned classes, the flat cluster has the lowest energy and the average energy in this cluster is about ⅕ of the energy in an edge cluster, while the edge clusters have the highest energy. Among these clusters, the flat cluster has the largest number of data points, namely more than 35%. This is an interesting result, because the norm of the data has no impact on the assignment of the data to different clusters.

If three bits are used for specifying the class membership, it may also be advantageous to specify eight clusters rather than just six. According to the invention, it may be assumed that the data in of a certain cluster may be modelled as a scale mixture of two Gaussians. Then, a second data assignment procedure may be learned again, using K-means clustering.

More particularly, the flat and the texture cluster may be further subdivided into two subclasses by learning another data assignment procedure within each of these clusters, having the following form $$Y = \begin{cases} \text{sub-cluster 1} & \sum_i \alpha_i^z (c_i^z)^2 \leq T \\ \text{sub-cluster 2} & \sum_i \alpha_i^z (c_i^z)^2 > T \end{cases} \quad (4)$$

wherein z is the index of the respective cluster, $\alpha_i^z$ are weighting coefficients and $c_i^z$ is the i-th transformation result of the z-th transformation function applied to the image patch. T is a constant threshold. The two Gaussians used in the scale mixture for learning have the same covariance matrix (up to a scale factor) as the angular Gaussian distribution of the respective cluster. In this way, two sub-clusters may be obtained for both the 'flat' cluster and the 'texture' cluster, which may be named 'flat$_1$' and 'flat$_2$' and 'texture$_1$' and 'texture$_2$' respectively. In the present embodiment, there exist therefore four 'edge' clusters, two flat clusters and two texture clusters.

If only global bases are considered for encoding images, a total number of eight classes may be used for the encoding. Therefore, only three bits would be required for determining or indicating class association or membership.

According to a different embodiment of the invention, instead of using transformation functions learned by statistically analysing or clustering the training image patches from a given database, transformation functions may be chosen that are faster to compute in practice.

If the bases for the transformation functions are fixed beforehand, the parameters of the classifier may be learned by using a variant of the learning procedure discussed in connection with FIG. 3.

In the initializing step, for each basis $U_z$ to be learned, the covariance $\Lambda_z$ is initially set to $U_z D_z U_z^T$, wherein $U_z$ is a basis of a fixed transform chosen beforehand, $U_z^T$ is the transpose of $U_z$ and $D_z$ may be a randomly chosen diagonal matrix whose diagonal coefficients $d_{jj}$ may be ordered in decreasing order. In other words, if the eigenvector decomposition of the covariance matrix $\Lambda_z$ is $UDU^T$, $D$ being a diagonal matrix comprising the eigenvalues (variances) of the respective eigenvector basis $U$, the matrices $U$, $U^T$ are now taken to be fixed and set to a chosen basis, leaving only the matrix $D$ to be calculated using the likelihood-based algorithm described in connection with FIG. 3.

In the next step, the current image patch from the set of training image patches may be assigned to a cluster $z$ according to the maximum likelihood criterion described in connection with FIG. 3.

Then, the covariance $\Lambda_z D$ may be determined, analogously to step 330 discussed in connection with FIG. 3, wherein $U$, $U^T$ may be held fixed and only the coefficients of diagonal matrix $D$ are inferred from the given data.

The procedure terminates analogously to step 340 in FIG. 3.

After termination, the basis vectors of $U$, $U^T$ may be re-ordered in the order of decreasing magnitude of the newly learned $d_{jj}$, and a new basis is obtained. In other words, the present variant of the learning procedure does not only learn the covariances of the respective clusters, using fixed bases, but also an ordering of the basis vectors that is adapted to concentrate the energy for that respective class of image patches in the first dimensions.

Ideally, the fixed bases should approximate the transformation functions derived in the clustering process. In that respect, different orderings of the DCT basis may be used according to one embodiment of the invention to approximate the eigenbases of the six different clusters. Furthermore, 'directional' DCT bases may be specified, which can be used to approximate the eigenbases of the edge clusters in 45 and 135 degrees.

More particularly, the forward DCT transform $c_{u,v}$ of an image patch $s_{x,y}$ may be defined as follows:

$$c_{u,v} = \frac{2}{N} C_u C_v \sum_{x=0}^{N} \sum_{y=0}^{N} s_{x,y} \cos\frac{(2x+1)u\pi}{2N} \cos\frac{(2y+1)v\pi}{2N} \quad (5)$$

where $c_{u,v}$ is the result of applying the transformation function, $s_{x,y}$ represents a pixel of an image patch, the size of the patch is N×N and $$C_u, C_v = \begin{cases} \frac{1}{\sqrt{2}}, & u, v = 0 \\ 1, & \text{otherwise.} \end{cases}$$

The bases for edges in 45 and 135 degrees may be obtained analogously, using, for these classes, a directional basis obtained by adding and subtracting two DCT bases as follows:

$$d_{u,v} = \begin{cases} \frac{1}{\sqrt{2}}(c_{u,v} + c_{v,u}), & u > v \\ \frac{1}{\sqrt{2}}(c_{u,v} - c_{v,u}), & u < v \\ c_{u,v}, & \text{otherwise.} \end{cases} \quad (6)$$

FIGS. 8(a)-8(b) show the DCT bases associated with equation (5) and the bases for 45 and 135 degrees associated with equation (6) and resulting from superposition.

By fixing the first basis for the above-described six clusters and the second basis for the two 45 and 135 degree clusters, learning the respective variances and ordering the basis vectors according to the magnitude of their respective variances for each cluster, the parameters of the classifier and the class-specific transformation functions for 8 clusters may be obtained.

Figure 9:
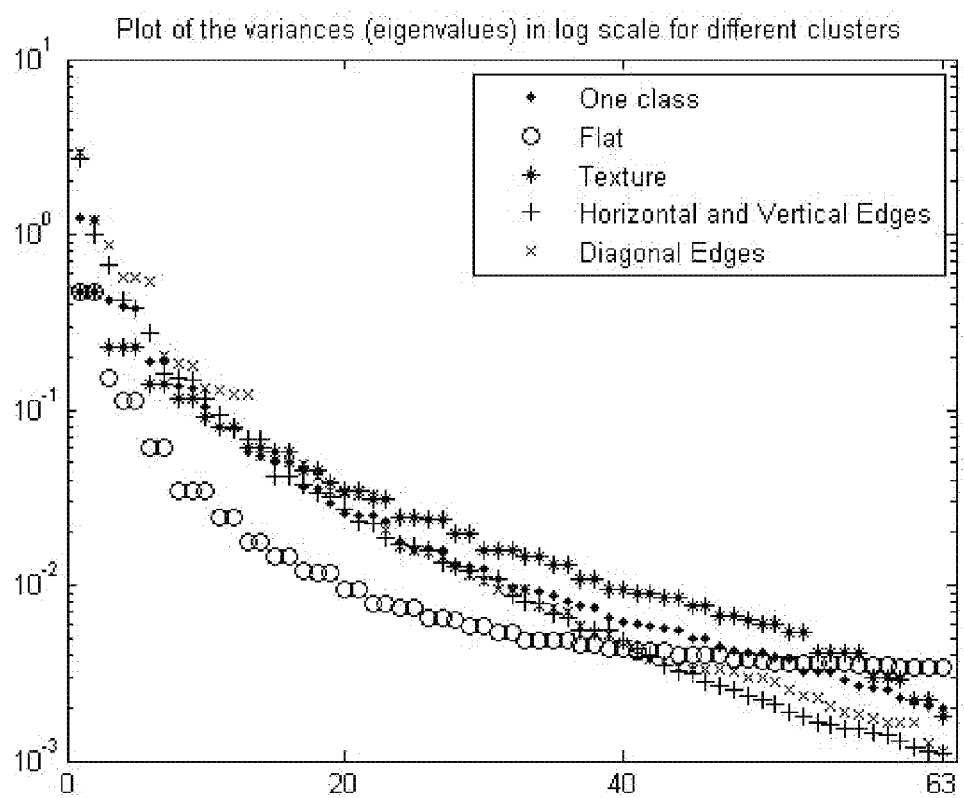
FIG. 9 shows a diagram of the variance decay of different clusters using fixed transforms.

FIG. 9 shows plots of some of the learned variances in log scale for different clusters, ordered in decreasing order of magnitude. In contrast to FIG. 5, the decrease in variance is shown when the eigenbases have been replaced by pre-determined bases, as explained above. The clusters, whose variances decrease rapidly, are edge-selective clusters in 0 and 90 degrees (+ symbol) or 45 and 135 degrees (x symbol). The variance of the flat cluster decreases most rapidly in the beginning and saturates at a variance of about $4 \cdot 10^{-3}$ (o symbol). For the texture class, the variances decrease slowly (* symbol). For the sake of comparison, also the decrease in variance is plotted that is obtained by applying the Karhunen-Loéve transform (KLT) to the entire set of data without clustering (· symbol).

Finally, the predetermined set of transformation functions may further comprise sparse transformations of the DCT basis similar to the construction of the 'directional' DCT basis specified above.

D. Quantization

Subsequently, the resulting coefficients may be quantized, similar to the JPEG standard.

According to one embodiment of the invention, the quantization step may be split into two stages. In the first stage, a threshold may be applied that determines when a particular coefficient may be put to zero. In the second stage, quantization is applied.

The thresholding step may be uniform with regard to all classes of image patches. Alternatively, the thresholding step may be class-specific. In other words, the corresponding table or matrix for the thresholding procedure may depend on the respective class of an image patch, similar to the above-described transformation functions. More particularly, the corresponding quantization table may be obtained from psychophysical experiments.

Figure 12A:
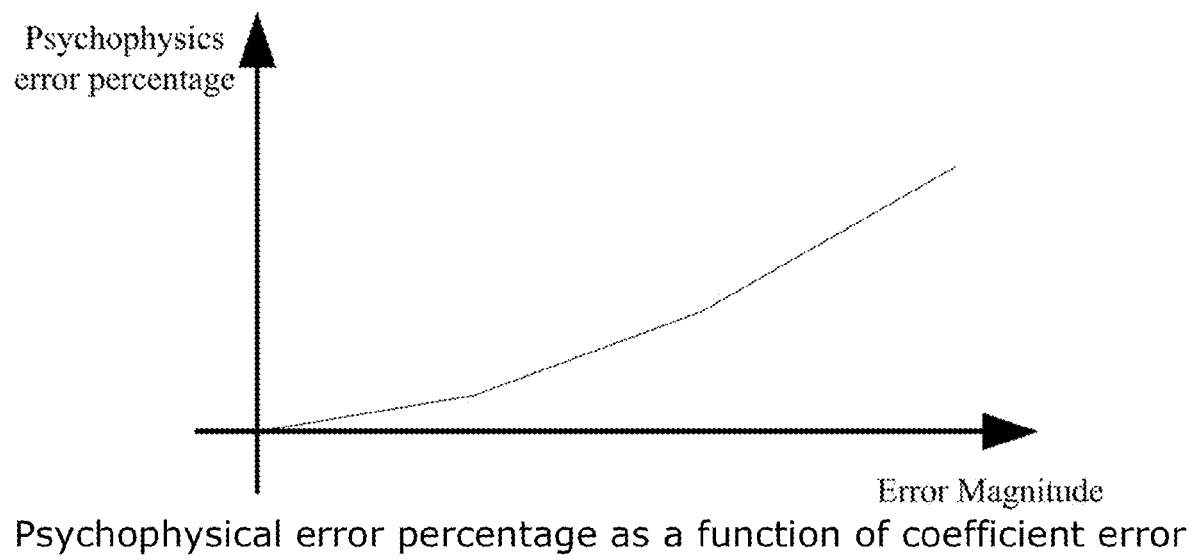
FIGS. 12a, 12b show diagrams of a psychophysical error percentage as a function of coefficient error (12a) and a histogram over coefficient values (12b)
Figure 12B:
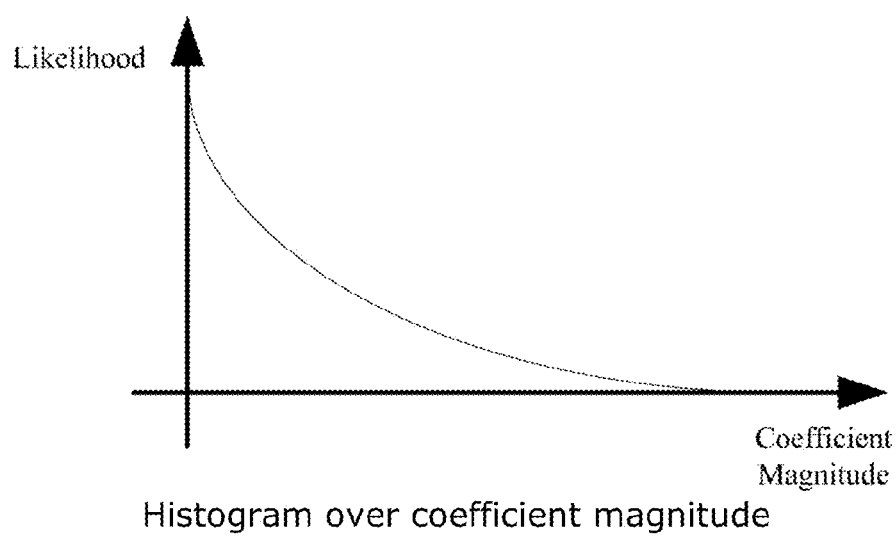

FIGS. 12a-12b shows diagrams of a psychophysical error percentage as a function of coefficient error (12a) and a histogram over coefficient values (12b). A psychophysical error percentage may be determined for each coefficient as a function of the magnitude of the error added to that coefficient.

Assuming that the total error of the image patch is equivalent to the sum of the psychophysical errors for each coefficient, the table for the threshold may be obtained by finding, for the fixed total perceptual error, the thresholds that lead to a maximum number of zeros.

This optimization problem may be solved by adding a small error to each coefficient that corresponds to a psychophysical error $\Delta P$:

$$\Delta q_i = f_i(\Delta P)$$

wherein $f$ is the inverse function of coefficient $i$ that is shown in FIG. 12a and the new error value is $q_i = q_i + \Delta q_i$. Based on this new coefficient, the percentage of coefficients set to zero may be calculated as the cumulative distribution of that coefficient which is smaller than the threshold. The error leading to the maximum percentage improvement of the coefficients that are set to zero may be added to the coefficient. This procedure may be repeated until the overall psychophysical error for the above-mentioned table has been reached.

The second table used for the quantization may be derived in a similar way as the first table. However, for this table, the error may be added to the coefficient that leads to the maximum improvement of entropy. Considering that the error value of the coefficient i is $q_i$ and the probability distribution is calculated over the quantized coefficient $$\hat{c}_i = \text{round}\left(\frac{c_i}{q_i}\right),$$

the entropy may be given as $$H_i = \sum_{k=1}^{N} P(\hat{c}_i = k)\log(P(\hat{c}_i = k)).$$

E. Entropy Coding

As in the JPEG standard, different modes may be used in connection with the inventive methods for entropy coding.

Sequential Encoding.

In sequential mode, the quantized AC coefficients for each image patch or block constitute one section and may be entropy encoded. More particularly, the aforementioned ordering of the eigenvectors from high-energy to low-energy may be used for grouping the quantized coefficients. Then, entropy coding may be applied, following the procedure known from the JPEG standard. The symbols for the entropy encoding may be similar to the symbols defined in the JPEG standard.

Progressive Encoding.

Progressive mode coding allows one to reconstruct an image progressively from low-resolution to high resolution, which is particularly useful for web browsing.

In progressive mode, the image patches assigned to the same cluster may be scanned through the entire image. In other words, all coefficients belonging to the i-th basis of function of their respective cluster may be put together and treated as one block.

FIGS. 10(*a*)-10(*d*) show progressive scans for edge image patches in different orientations, i.e. depending on the assigned class for the image patch.

According to the invention, the progressive mode may be used to take further advantage of the clustering in order to exploit dependencies between neighboring image patches. For the edge clusters, the images are scanned in accordance with the dominant orientation of the edges in that mixture. By this, correlations between different image patches may be exploited, leading to better compression ratios.

Hierarchical Encoding.

According to a further embodiment of the invention, the image may be encoded in hierarchical mode. More particularly, the low-pass components of the image may be encoded first and then used to predict the high-pass components. This may be repeated until the entire image is encoded. For 8×8 image patches, there are a total of 8 stages for this successive improvement of the resolution. A low resolution image may be obtained from the quantized low-pass components of the image. This image may be upsampled in order to obtain a higher level of resolution. The difference between the result of transforming the upsampled image and the result of the transform of the true image may then be encoded. This encoding procedure is similar to coding in progressive mode, with the distinguishing feature that the result of transforming the difference is encoded.

In a preferred embodiment of the invention, new symbols may be added in the progressive scan in order to exploit long run-lengths of zero coefficients.

Figure 11:
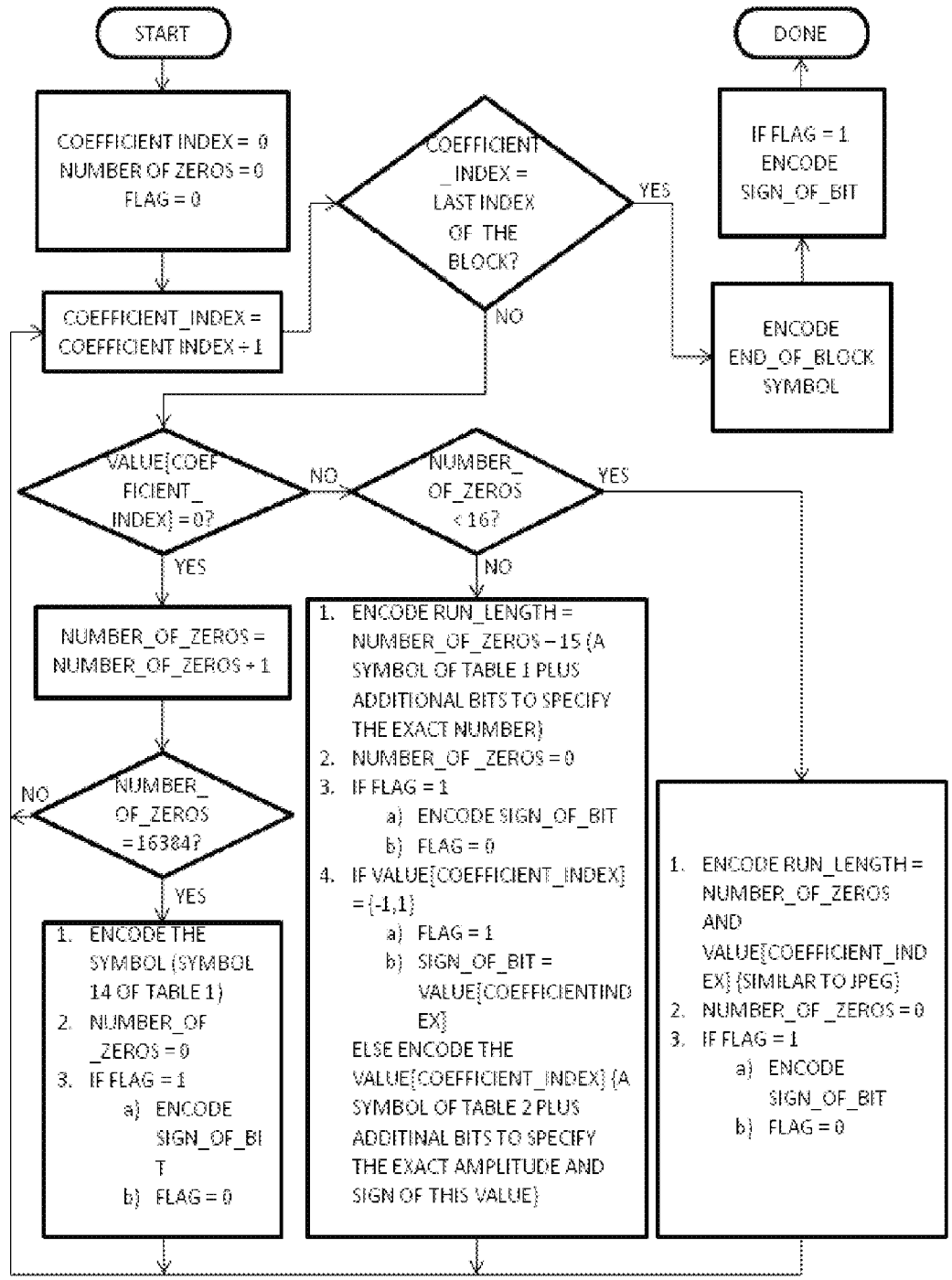
FIG. 11 is a flowchart showing how the AC coefficients may be encoded according to an embodiment of the invention.

FIG. 11 is a flowchart showing how the AC coefficients may be encoded in progressive mode according to the above-described embodiment of the invention.

For a run-length that is smaller than or equal to 15, one may use the same symbols as in sequential mode. Otherwise, 15 is subtracted from the run-length and the new symbols defined in the following table may be used to encode this run-length:

TABLE 1

| Symbol | Runlength |
|--------|-----------|
| 0      | 1         |
| 1      | 2, 3      |
| 2      | 4 ... 7   |
| 3      | 8 ... 15  |
| 4      | 16 ... 31 |
| 5      | 32 ... 63 |
| 6      | 64 ... 127 |
| 7      | 128 ... 255 |
| 8      | 256 ... 511 |
| 9      | 512 ... 1023 |
| 10     | 1024 ... 2047 |
| 11     | 2048 ... 4095 |
| 12     | 4096 ... 8191 |
| 13     | 8192 ... 16383 |
| 14     | ≥16384    |

These symbols may be followed by additional bits specifying the exact length of the run-length difference. Further, a symbol may follow defining the value of the subsequent coefficient, as defined in the following table:

TABLE 2

| Symbol | Amplitude |
|--------|-----------|
| 1      | −2, 2     |
| 2      | −4, −3, 3, 4 |
| 3      | −8 ... −5, 5 ... 8 |
| 4      | −16 ... −9, 9 ... 16 |
| 5      | −32 ... −17, 17 ... 32 |
| 6      | −64 ... −33, 33 ... 64 |
| 7      | −128 ... −65, 65 ... 128 |
| 8      | −256 ... −129, 129 ... 256 |
| 9      | −512 ... −257, 257 ... 512 |
| 10     | −1024 ... −513, 513 ... 1024 |

As before, this symbol may be followed by additional bits which specify the sign and the exact amplitude of the coefficient. As may be seen, neither −1 nor 1 are comprised in table 2. It is not necessary to specify an extra amplitude symbol for the case of −1 or 1 because it may be inferred during the encoding process as follows: If, when decoding, the run-length is not followed by symbols of table 2, the amplitude of the coefficient must have been 1 or −1 and now the next bit will specify the sign. Thereby, the amount of bits necessary for coding may be decreased, because if the run-length is large, there is a large probability that the following bit is 1 or −1. If the run-length is greater than 16383, the symbol number 14 may be used to encode 16384 zeros and the remaining zeros may be assigned to another symbol.

The above tables have been formulated for the case of 8-bit precision. For 12-bit precision, the symbols of the following table may be added to table 2 (above):

TABLE 3

| Symbol | Amplitude |
| --- | --- |
| 11 | −2048 ... −1025, 1025 ... 2048 |
| 12 | −4096 ... −2049, 2049 ... 4096 |
| 13 | −8192 ... −4097, 4097 ... 8192 |
| 14 | −16384 ... −8193, 8193 ... 16384 |

In all modes, the DC coefficient may be coded in a manner similar to JPEG. In particular, the DC coefficients may be processed differently from the AC coefficients. For example, considering an 8×8 gray-level image patch, one of the coefficients encodes the DC component and the other 63 coefficients are the AC components which are determined depending on the selection of the transformation function. The encoding of the DC component may use a "delta modulator" (DM), as in JPEG. In other words, the previously quantized DC coefficient may be used to predict the current quantized DC coefficient, and only the difference may be encoded.

F. Scalability

As explained in ITU-T JPEG-Plus (proposal for extending ITU-T T.81 for advanced image coding, April 2006), the DCT basis has a scalability property that may be used for successively improving the image quality in applications such as web browsing.

Figure 13:
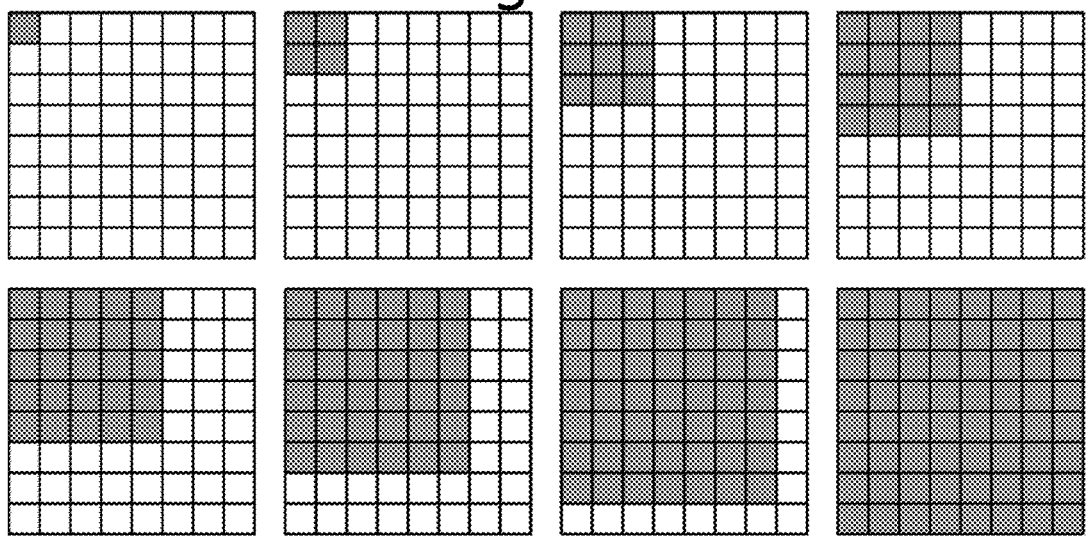
FIG. 13 shows a schematic diagram of a procedure choosing a subset of DCT coefficients.

FIG. 13 shows a schematic diagram of a procedure choosing a subset of DCT coefficients. The choice of the first DC basis results in a thumbnail image. For higher levels, an N×N subset of the coefficients may be used. The inverse N×N DCT may be used to reconstruct the image. In the above-cited JPEG standard document, it was shown that this method leads to perfect scalability for eight scales, which is superior to the scalability of JPEG 2000.

The transform defined in equation (6) is also scalable, because the new basis functions obtained by adding or subtracting pairs of DCT basis functions stay in the same scale.

Figure 14:
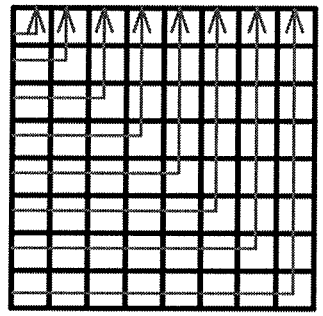
FIG. 14 shows a construction procedure for the directional DCT basis designed by Fu et al.

Another candidate for a scalable transformation is a modified version of the directional DCT proposed in the article by Fu et al. The method for creating the bases for 45 degree is shown in FIG. 14. In the first part, a one dimensional DCT transform is applied along diagonal elements and the coefficients from low-pass to high-pass are arranged in from lower-left to upper-right. Then, a second 1-D DCT is applied in an L-shaped fashion as shown in the middle part of the figure. The first and the second index of the resulting coefficients $\hat{A}(i, j)$ correspond to the index of the DCT along the diagonal and the L-shaped stripes, respectively.

Figure 15:
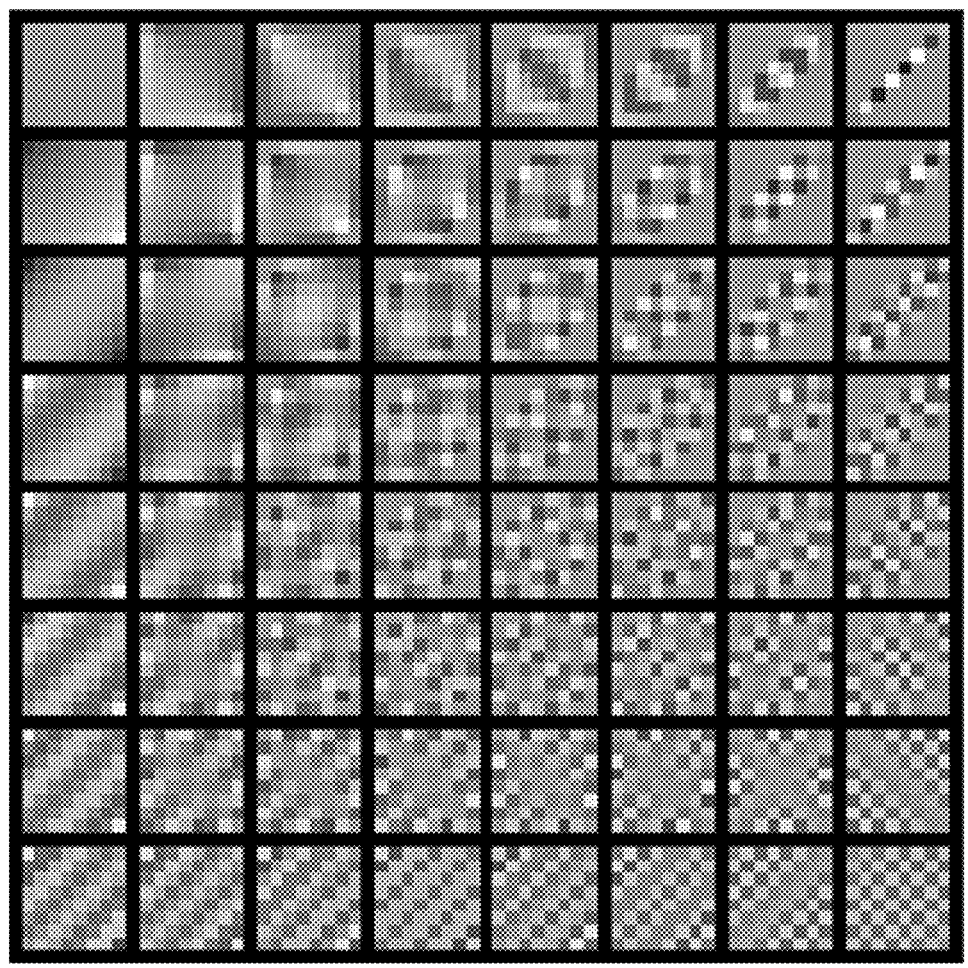
FIG. 15 shows a modification of the directional DCT basis which includes the DC component.

One problem of this basis is that there is no DC basis function. This problem can be solved by modifying the basis as follows: The coefficient $\hat{A}(0,0)$ is the coefficient of lowest frequency in the basis. The corresponding basis function is replaced by the DC basis function and subsequently the QR method is used to obtain an orthogonal basis. The DC component consists of a superposition of only a few basis functions of the directional DCT basis originally proposed by Fu et al. Therefore with very few computations, we can calculate the coefficients of the new transform. This basis is shown in FIG. 15.

It is also possible to have scalability for this transform. If the size of the image patch is N×N, it is possible to reconstruct the image patch at a patch size M×M by choosing a subset of $M^2$ coefficients from the given $N^2$ coefficients. The indices of this subset of coefficients correspond to the indices that one would obtain if the directional DCT was applied to an M×M image patch. For example, for constructing 2×2 image patches, one may pick $\hat{A}(0,0)$, $\hat{A}(0,1)$, $\hat{A}(0,2)$ and $\hat{A}(1,1)$ and apply the inverse 2×2 transform to these coefficients. Similarly, for constructing 3×3 image patches, one may pick $\hat{A}(0, 0)$, $\hat{A}(0,1)$, $\hat{A}(0,2)$, $\hat{A}(0,3)$, $\hat{A}(0,4)$, $\hat{A}(1,0)$, $\hat{A}(1,1)$, $\hat{A}(1,2)$, and $\hat{A}(2,0)$ (Notice that, sometimes there is a sign flip that must be taken into the account).

G. Low Bitrate Compression

In the case of low bits-rate compression, only the low-pass coefficients may be encoded for each image patch. For the decoding, blocking artifacts may be avoided by first constructing a small image and then up-sampling. Alternatively, the high-pass components of each image patch may be estimated from the low-pass components of that image patch together with the low-pass components of neighboring image patches.

In other words, a method similar to the one described in the ITU-T JPEG Plus document (above) may be used for low-bit rate compression. As explained, the method for image coding according to the invention has the desired property of scalability. An image may be compressed up to a predetermined scale. In the receiver, the image is then up-sampled to scale up the received image. The advantage of this method is that no downsampling of the image is required.

H. Video Compression

FIGS. 16(a)-16(b) illustrate how the method of the present invention may be combined with existing video compression methods such as MPEG-2 or H.263-MPEG-4 part 10.

In general, video compression methods utilize two different types of frames, intra- and inter-frames. Intra-frames are frames that are encoded independently and for which motion compensation is not used, unlike for inter-frames. Both types of frames may be compressed by the methods presented above.

In particular, when compressing intra-frames, an index may determine for each image patch to which class it belongs and consequently, which content-specific transformation function must be applied. According to H.263, the neighbouring pixels are used in intra-frame compression to predict the pixel of the image patch based on the direction of the image patch and resulting pixels are transform coded using DCT. According to the invention, an appropriate transform coder based on learned clusters may be used instead of coding the resulting coefficient using DCT.

In inter-frame compression, an image estimated from other frames is subtracted from the image patch and the resulting image patch is encoded. Here, according to the invention, a mixture of transforms may be used instead of the fixed transform. The estimated image may be used to determine the class and the resulting image may be compressed using the transform that was determined using the estimated image. Consequently, no index for determining class membership needs to be stored.

Results

In order to show the potential of the above described methods for image compression, a simple embodiment has been compared to DCT-based JPEG image compression, using a reference image database comprising 1166 images. In all comparisons, the overhead for storing class indices is taken into account.

Figure 17A:
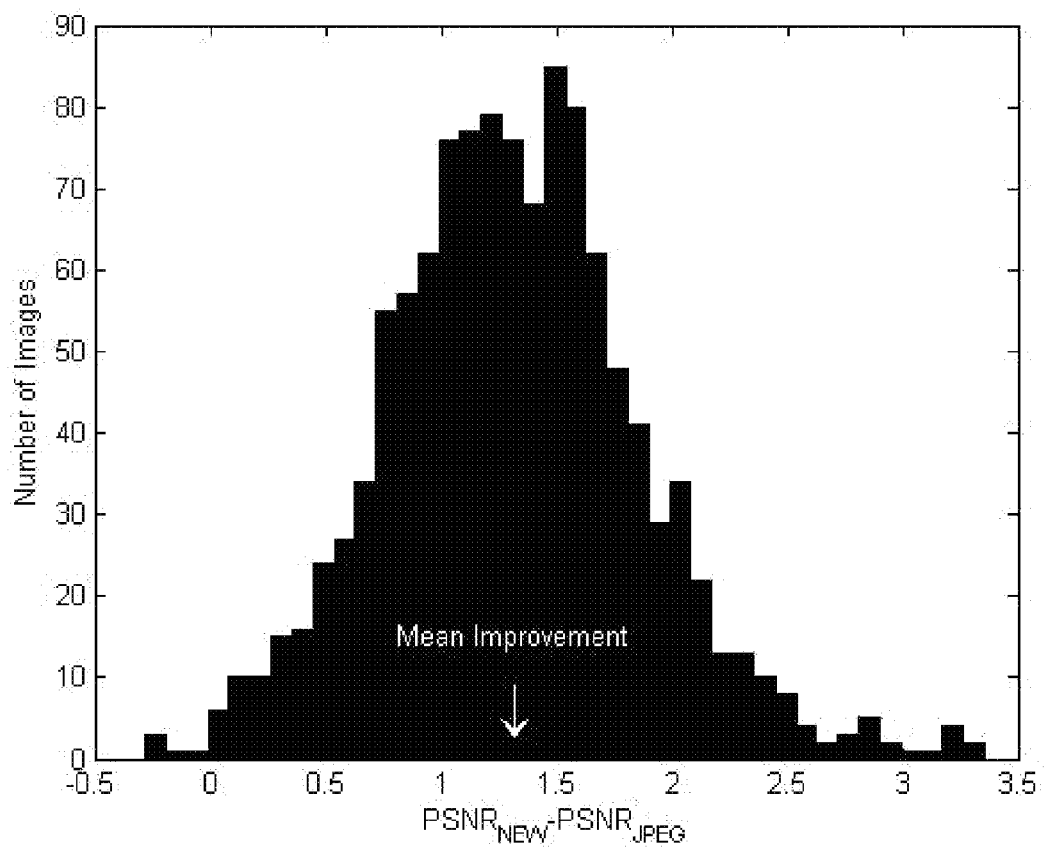
FIGS. 17a, 17b, and 17c show the results of comparing a method according to an embodiment of the invention with JPEG compression.

FIG. 17a shows a histogram over the improvement of the peak signal-to-noise ratio (PSNR) in the reference images that has been achieved by a compression method according to the invention over the JPEG algorithm. In the mean, PSNR was improved by 1.32 dB as compared to JPEG.

Figure 17B:
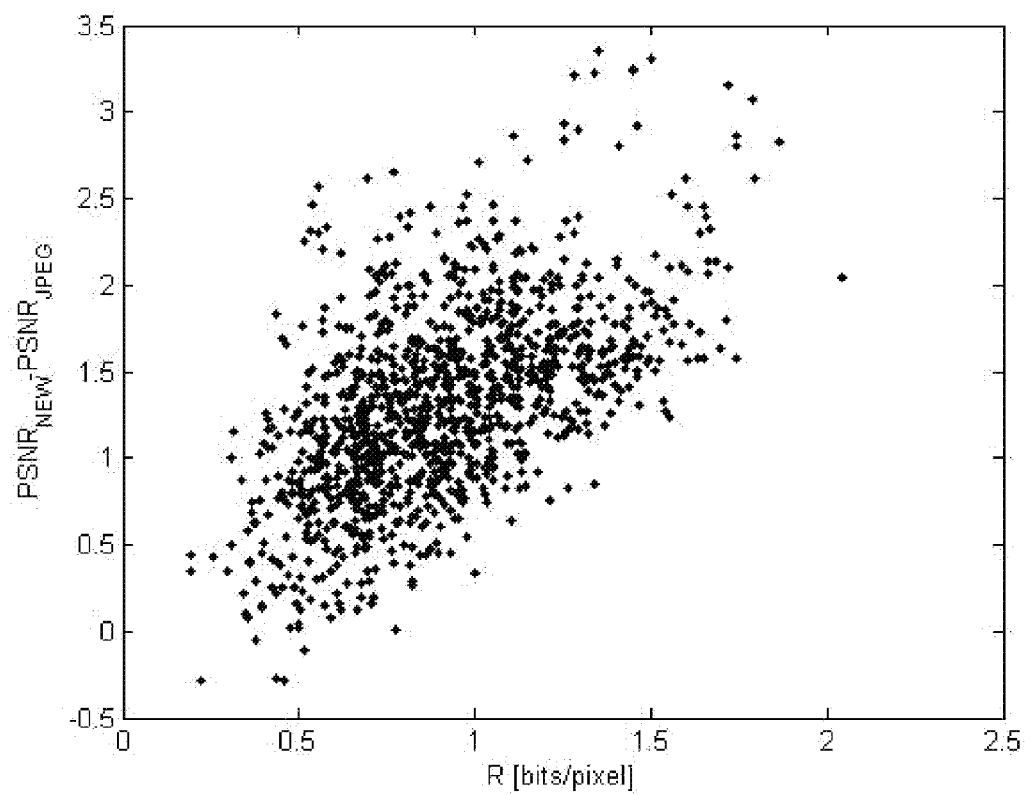

FIG. 17b shows the same data as FIG. 17a as a scatter plot, depending on the bit rate.

Figure 17C:
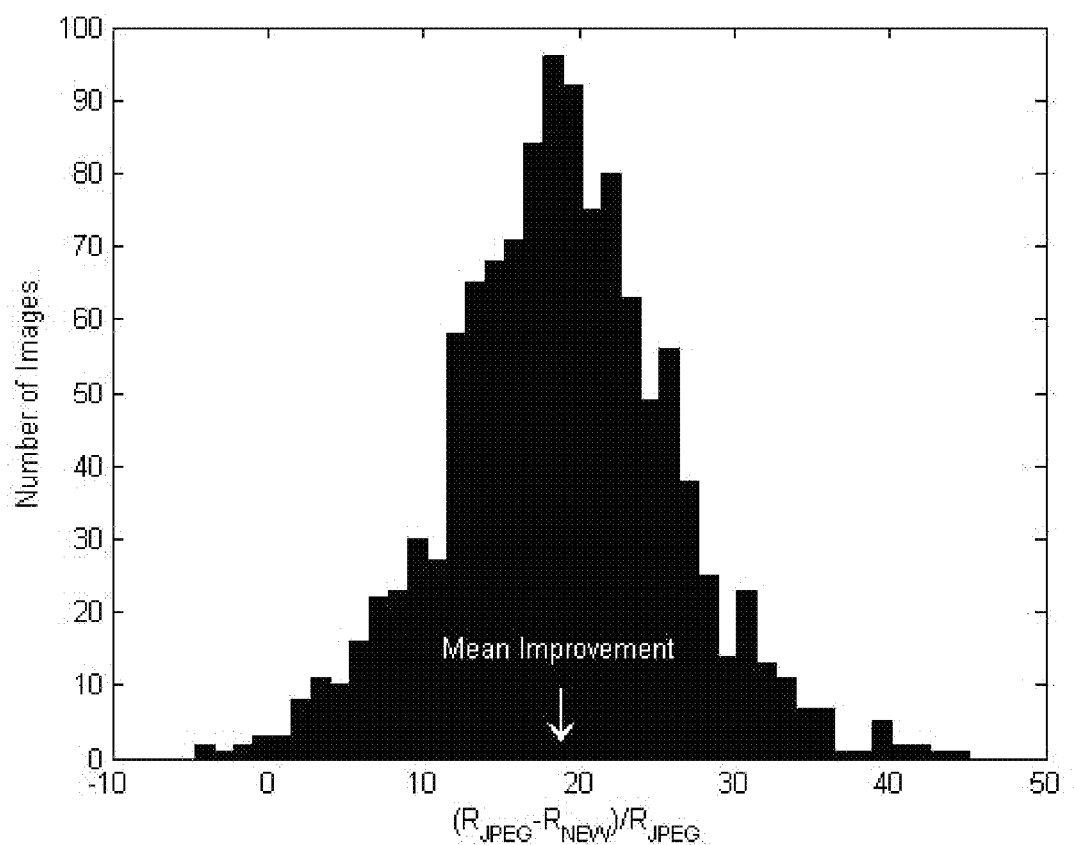

FIG. 17c shows the improvement of the compression ratio measured as a percentage reduction of required storage space, for identical PSNR. It may be seen in that the average bit rate in the image compression method according to the invention is 19% smaller than the corresponding bit rate of JPEG.

At the same time, the image compression methods according to the invention exhibit the same advantages that are crucial for JPEG, namely high speed and scalability.

We claim:

1. A method for compressing a digital image, comprising the steps of:
    selecting an image patch of the digital image;
    assigning the selected image to a specific class (z), using a classifier, wherein the classifier assigns the image patch to a class (z) such that:

$$\sum_{i=1}^{M} \alpha_i^z (c_i^z)^2 \quad z \in \{1, \ldots, K\},$$

becomes maximal, wherein K is a number of classes, z is a class index, $\alpha_i^z$ are the weighting coefficients and $c_i^z$ is the i-th transformation result of the z-th transformation function applied to the image patch;
    transforming the image patch with a class-specific transformation function;
    quantizing the transformed image patch,
    wherein the weighting coefficients $$\alpha_i^z = \frac{1}{\lambda_i} |\Lambda_z|^{\frac{1}{M}}$$

wherein M is the total number of transformation result coefficients not including the DC coefficient, $\lambda_i$ is the i-th eigenvalue and $|\Lambda_z|$ is the determinant of a covariance matrix $\Lambda_z$ of said class (z), and
    wherein the covariance matrix has been learned from a set of training image patches, based on a mixture of angular Gaussian distributions model.

2. The method according to claim 1, wherein the basis of the transformation function for each class is fixed.

3. The method according to claim 1, wherein the class-specific transformation function is represented by an eigenvector basis of the covariance matrix ($\Lambda_z$) of the statistical distribution of the respective class (z).

4. The method according to claim 3, wherein the vectors of the eigenvector basis are ordered in decreasing order of the magnitude of their corresponding eigenvalues.

5. A device for compressing a digital image, comprising:
    means for selecting an image patch of the digital image;
    means for assigning the selected image patch to a specific class (z), using a classifier, wherein the classifier assigns the image patch to a class (z) such that:

$$\sum_{i=1}^{M} \alpha_i^z (c_i^z)^2 \quad z \in \{1, \ldots, K\},$$

becomes maximal, wherein K is a number of classes, z is a class index, $\alpha_i^z$ are weighting coefficients and $c_i^z$ is an i-th transformation result of a z-th transformation function applied to the image patch;
    means for transforming the image patch with said class-specific transformation function;
    means for quantizing the transformed image patch,
    wherein the weighting coefficients $$\alpha_i^z = \frac{1}{\lambda_i} |\Lambda_z|^{\frac{1}{M}}$$

wherein
    M is the total number of transformation result coefficients not including the DC coefficient, $\lambda_i$ is the i-th eigenvalue and $|\Lambda_z|$ is the determinant of a covariance matrix $\Lambda_z$ of said class (z), and
    wherein the covariance matrix has been learned from a set of training image patches, based on a mixture of angular Gaussian distributions model.

6. A non-transitory machine-readable medium, storing a digital image compressed according to claim 1.

* * * * *